US011309561B2

(12) United States Patent
Irie et al.

(10) Patent No.: US 11,309,561 B2
(45) Date of Patent: Apr. 19, 2022

(54) FUEL CELL TEMPERATURE DISTRIBUTION CONTROL SYSTEM, FUEL CELL, AND TEMPERATURE DISTRIBUTION CONTROL METHOD

(71) Applicant: MITSUBISHI HITACHI POWER SYSTEMS, LTD., Yokohama (JP)

(72) Inventors: Hiroki Irie, Kanagawa (JP); Takuma Nagai, Kanagawa (JP)

(73) Assignee: MITSUBISHI POWER, LTD., Yokohama (JP)

( * ) Notice: Subject to any disclaimer, the term of this patent is extended or adjusted under 35 U.S.C. 154(b) by 15 days.

(21) Appl. No.: 16/959,471

(22) PCT Filed: Jan. 28, 2019

(86) PCT No.: PCT/JP2019/002675
§ 371 (c)(1),
(2) Date: Jul. 1, 2020

(87) PCT Pub. No.: WO2019/163421
PCT Pub. Date: Aug. 29, 2019

(65) Prior Publication Data
US 2021/0075041 A1    Mar. 11, 2021

(30) Foreign Application Priority Data

Feb. 23, 2018  (JP) .............................. JP2018-031057

(51) Int. Cl.
*H01M 8/04* (2016.01)
*H01M 8/04701* (2016.01)
(Continued)

(52) U.S. Cl.
CPC ... *H01M 8/04708* (2013.01); *H01M 8/04097* (2013.01); *H01M 8/04328* (2013.01);
(Continued)

(58) Field of Classification Search
CPC ......... H01M 8/04708; H01M 8/04097; H01M 8/04328; H01M 8/04761
See application file for complete search history.

(56) References Cited

U.S. PATENT DOCUMENTS

2005/0048336 A1\*  3/2005  Takebe .............. H01M 8/04225
429/413
2006/0099467 A1\*  5/2006  Cutright .................... C01B 3/48
429/414

(Continued)

FOREIGN PATENT DOCUMENTS

JP    2003-115315 A    4/2003
JP    2017117550 A     6/2017

(Continued)

OTHER PUBLICATIONS

International Search Report dated Apr. 9, 2019, issued in counterpart International Applicatin No. PCT/JP2019/002675, with English translation (4 pages).

(Continued)

*Primary Examiner* — Olatunji A Godo
(74) *Attorney, Agent, or Firm* — WHDA, LLP

(57) ABSTRACT

A temperature distribution control system for a fuel cell provided with a cell stack including a power generation unit that generates power by causing, in a fuel battery cell formed of a laminate of an air electrode, a solid electrolyte, and a fuel electrode, an oxidizing gas flowing on the air electrode side and a fuel gas flowing on the fuel electrode side to react with each other. The temperature distribution control system is provided with a temperature measurement unit which
(Continued)

measures the temperature of a fuel gas supply part in the power generation unit; and a control unit which, on the basis of the result of measurement performed by the temperature measurement unit, controls the temperature of the fuel gas supply part to within an appropriate temperature range set in advance, thereby controlling a temperature distribution state in a fuel gas flow direction in the power generation unit.

7 Claims, 12 Drawing Sheets

(51) Int. Cl.
    *H01M 8/04089*     (2016.01)
    *H01M 8/0432*     (2016.01)
    *H01M 8/04746*     (2016.01)
    *H01M 8/04992*     (2016.01)
    *H01M 8/12*     (2016.01)

(52) U.S. Cl.
    CPC ... *H01M 8/04761* (2013.01); *H01M 8/04992* (2013.01); *H01M 8/12* (2013.01); *H01M 2008/1293* (2013.01)

(56) References Cited

U.S. PATENT DOCUMENTS

| | | | |
|---|---|---|---|
| 2007/0287044 A1* | 12/2007 | Arthur | H01M 8/04104 |
| | | | 429/415 |
| 2013/0065141 A1* | 3/2013 | Uratani | H01M 8/04373 |
| | | | 429/421 |
| 2014/0308596 A1 | 10/2014 | Ibuka et al. | |
| 2017/0362724 A1 | 12/2017 | Planque et al. | |

FOREIGN PATENT DOCUMENTS

| | | | |
|---|---|---|---|
| JP | 2017142919 A | 8/2017 | |
| JP | 2018-6003 A | 1/2018 | |
| WO | 2013/069632 A1 | 5/2013 | |
| WO | 2016/096752 A1 | 6/2016 | |

OTHER PUBLICATIONS

Office Action dated Sep. 1, 2019, issued in counterpart KR Application No. 10-2018-0110372, with English translation (10 pages).
Office Action dated Feb. 25, 2020, issued in counterpart JP Application No. 2019-545373, with English translation (9 pages).
Written Opinion dated Apr. 9, 2019, issued in counterpart Application No. PCT/JP2019/002675, with English Translation. (9 pages).

* cited by examiner

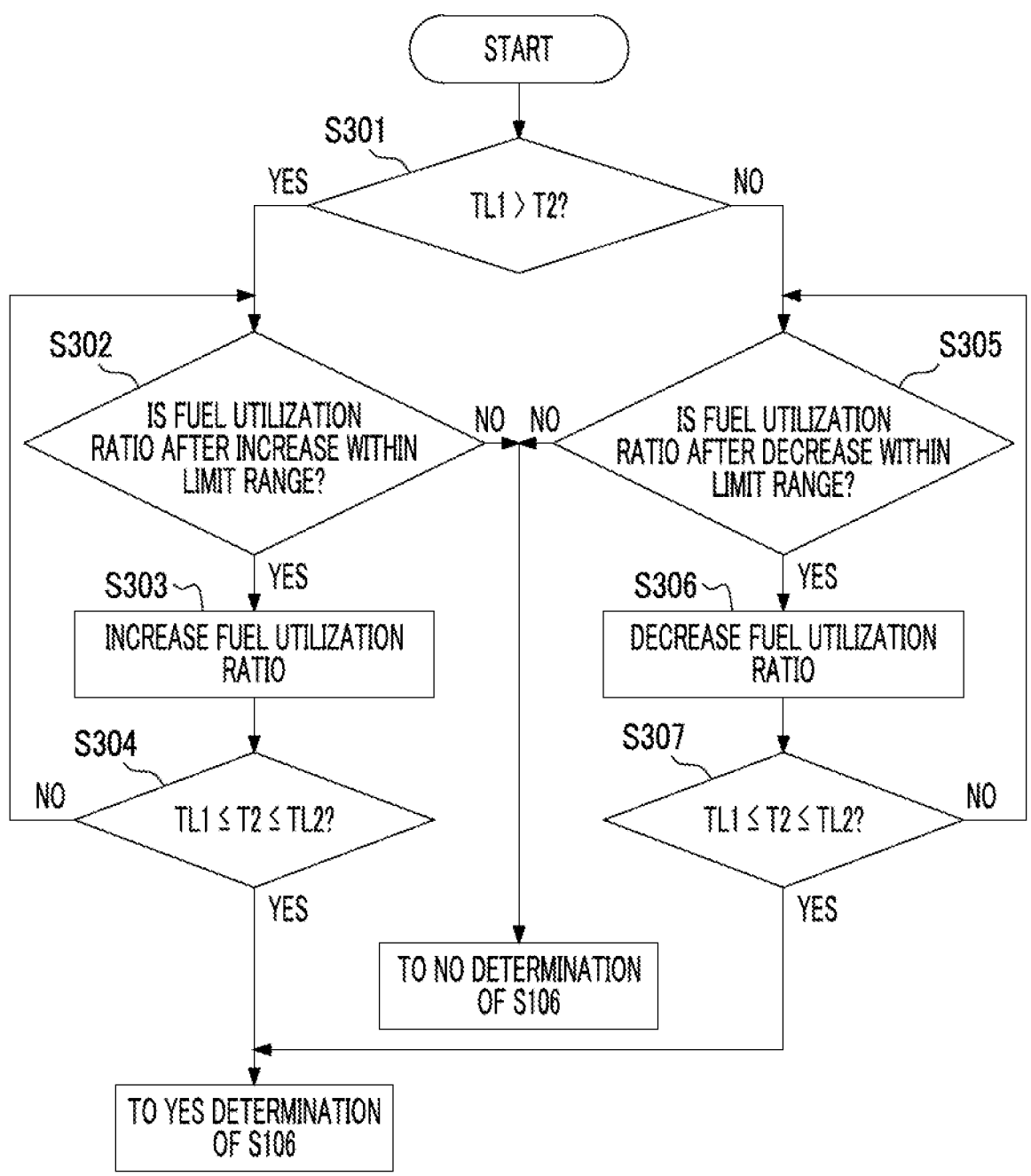

FUEL CELL TEMPERATURE DISTRIBUTION CONTROL SYSTEM, FUEL CELL, AND TEMPERATURE DISTRIBUTION CONTROL METHOD

TECHNICAL FIELD

The present invention relates to a fuel cell temperature distribution control system, a fuel cell, and a temperature distribution control method.

BACKGROUND ART

A solid oxide fuel cell (SOFC), which is one type of fuel cell, is a fuel cell in which ceramics such as zirconia ceramics are used as an electrolyte and city gas, natural gas, oil, methanol, coal-gasified gas, or the like is operated as fuel. In a cell stack (power generation unit) of the SOFC, an oxidizing gas such as air is supplied to an air electrode side, and the aforementioned fuel gas is supplied to a fuel electrode side provided with the electrolyte interposed therebetween, to thereby cause a reaction in a high-temperature atmosphere of about 700° C. to 1000° C. to generate power in the SOFC, since the amount of power generation due to the reaction between the oxidizing gas and the fuel gas has temperature-dependent characteristics, the amount of power generation decreases as the temperature drops.

PTL 1 describes that a decrease in power generation performance is suppressed by controlling the temperature on a fuel gas inlet side in a cell stack is controlled so as not to be lower than a predetermined temperature.

CITATION LIST

Patent Literature

[PTL 1] Japanese Unexamined Patent Application Publication No. 2017-142919

SUMMARY OF INVENTION

Technical Problem

However, the SOFC cell stack has a long structure, and the temperature distribution state of the cell stack in a fuel gas flow direction (longitudinal direction) is an arc-shaped temperature distribution state that is a state where the temperature in the vicinity of a fuel gas supply port and the temperature in the vicinity of the fuel gas discharge port in a power generation region have dropped with respect to the temperature in the vicinity of the center of the power generation region of the cell stack. That is, even if the temperature in the vicinity of the center of the power generation region in the cell stack is kept at a high-temperature state, in a case where the temperature in the vicinity of the fuel gas inlet side of the power generation region or the temperature in the vicinity of the fuel gas discharge port side has dropped, there is a possibility that the resistance of cells in the vicinity of a low-temperature region drops, the amount of power generation decreases, and the output of the SOFC cell stack decreases.

The present invention has been made in view of such circumstances, and an object thereof is to provide a fuel cell temperature distribution control system, a fuel cell, and a temperature distribution control method capable of optimizing an operation state and improving a power generation output.

Solution to Problem

According to a first aspect of the present invention, there is provided a fuel cell temperature distribution control system including a cell stack including a power generation unit that generates power by causing, in a fuel battery cell formed of a laminate of an air electrode, a solid electrolyte, and a fuel electrode, an oxidizing gas flowing on the air electrode side and a fuel gas flowing on the fuel electrode side to react with each other; a temperature measurement unit that measures a temperature of a fuel gas supply part in the power generation unit; and a control unit that, on the basis of a result of measurement performed by the temperature measurement unit, controls the temperature of the fuel gas supply part to within a preset appropriate temperature range, to control a temperature distribution state in a fuel gas flow direction in the power generation unit.

According to the above configuration, the temperature of the fuel gas supply part in the power generation unit (power generation region of the cell stack) is a control target. The temperature distribution state of the power generation unit in the fuel gas flow direction is an arc-shaped temperature distribution state that is a state in which the temperature of the fuel gas supply part and the temperature of the fuel gas discharge part as dropped with respect to the temperature of the central part of the power generation region. The temperature difference and the temperature distribution state of the arc-shaped temperature distribution can be almost uniquely estimated from the temperature of the fuel gas supply part in the power generation unit. That is, by controlling the temperature of the fuel gas supply part in the power generation unit, the temperature distribution state of the entire power generation unit can be controlled. For example, in the temperature distribution state of the power generation unit in the fuel gas flow direction, in a case where the temperature of the fuel gas supply part in the power generation unit is excessively low, the temperature of the fuel gas discharge part also drops excessively, and the amount of power generation of the entire power generation unit decreases. On the other hand, even in a case where the temperature of the fuel gas supply part is excessively high, the temperature of the fuel gas discharge part drops, and the amount of power generation of the entire power generation unit decreases. In this way, the temperature of the fuel gas discharge part becomes low depending on the temperature of the fuel gas supply part in the power generation unit. As a result, there is a possibility that a decrease in the amount of power generation of the entire power generation unit is caused. Therefore, by controlling the temperature of the fuel gas supply part to within the preset predetermined appropriate temperature range, the temperature distribution state of the power generation unit in the fuel gas flow direction can be appropriately controlled, and the temperature of the fuel gas discharge part can also be adjusted to an appropriate temperature (high-temperature state). For this reason, by controlling the temperature of the fuel gas supply part in the power generation unit to within the predetermined appropriate temperature range, the preset operation state of the power generation unit can be optimized, and the power generation output can be improved. The temperature of the fuel gas supply part in the power generation unit is a temperature in the vicinity of the fuel gas supply port in the power generation unit.

In the related art, at the time of test operation adjustment of a fuel cell power generation system or when the type or condition of fuel is changed, the temperature distribution state of the power generation unit of the cell stack changes.

In order to suppress a decrease in the amount of power generation due to the temperature distribution of the power generation unit, respective operating conditions are adjusted if an operator repeats trial and error. For this reason, substantial time is required to adjust the operating conditions, and it is difficult to efficiently optimize the operating temperature state in the entire power generation unit. However, since the temperature distribution state in the power generation unit can be optimized by controlling the temperature of the fuel gas supply part to within the preset predetermined appropriate temperature range, the power generation output can be improved with respect to diversification of fuel types, the time required to adjust the operating conditions can be shortened, and the work load on the operator can be reduced.

In the above fuel cell temperature distribution control system, the appropriate temperature range may be determined on the basis of a temperature of a central part of the power generation unit.

According to the above configuration, since the appropriate temperature range is determined on the basis of the temperature in the vicinity of the center of the power generation unit, the appropriate temperature range can be easily set. For example, the appropriate temperature range is set to a range of 80% or more and 90% or less with respect to the temperature of the central part of the power generation unit in the fuel gas flow direction.

In the temperature distribution control system, the fuel gas supplied to the fuel electrode may include at least a part of an exhaust fuel gas discharged from the fuel electrode side of the power generation unit as a recirculation flow rate of the exhaust fuel gas, and the control unit may include an exhaust fuel gas recirculation flow rate control unit that controls the temperature of the fuel gas supply part to within the preset appropriate temperature range by increasing or decreasing the recirculation flow rate of the exhaust fuel gas.

According to the above-described configuration, by increasing or decreasing the recirculation flow rate of the exhaust fuel gas, the temperature of the fuel gas supply part is controlled to within the preset appropriate temperature range. The exhaust fuel gas contains methane ($CH_4$) that is a combustible gas that has not contributed to the power generation reaction in the power generation unit. For this reason, in the fuel gas supply part, the temperature drop occurs due to the heat absorption action caused by the reforming reaction (for example, methane ($CH_4$), which is a combustible gas, and steam, react with each other and are reformed into hydrogen ($H_2$) and carbon monoxide (CO)) of the exhaust fuel gas. That is, the recirculation flow rate of the exhaust fuel gas and the temperature of the fuel gas supply part in the power generation unit have a correlation. For this reason, the temperature of the fuel gas supply part in the power generation unit can be adjusted by controlling the recirculation flow rate of the exhaust fuel gas. For example, by reducing the recirculation flow rate of the exhaust fuel gas, the reforming reaction, that is, the heat absorption action n of the exhaust fuel gas can be suppressed, and the temperature of the fuel gas supply part can be raised. From the above, by increasing or decreasing the recirculation flow rate of the exhaust fuel gas, it is possible to optimize the operation state of the power generation unit and improve the power generation output.

In the above temperature distribution control system, a control unit may include a fuel utilization ratio control unit configured to control the temperature of the fuel gas supply part to within the preset appropriate temperature range by increasing or decreasing a fuel utilization ratio.

According to the above-described configuration, since the temperature of the fuel gas supply part is controlled to within the preset predetermined appropriate temperature range by increasing or decreasing the fuel utilization ratio, it is possible to optimize the operation state of the power generation unit and improve the power generation output. In the fuel gas supply part, the temperature drop occurs due to the heat absorption action caused by the reforming of the fuel gas (for example, the methane ($CH_4$), which is a combustible gas, and steam react with each other and are reformed into hydrogen ($H_2$) and carbon monoxide (CO)). That is, since the amount of reforming reaction changes with an increase or decrease in the fuel utilization ratio, which is the ratio in which the combustible gas contained in the fuel gas is used for the power generation reaction, the fuel utilization ratio and the temperature of the fuel gas supply part in the power generation unit has a correlation. For this reason, the temperature of the fuel gas supply part in the power generation unit can be adjusted by controlling the fuel utilization ratio of the total fuel gas. For example, by increasing the flow rate of the combustible gas to decrease the fuel utilization ratio, the reforming reaction, that is, the heat absorption action of the combustible gas can be promoted, and the temperature of the fuel gas supply part can be raised. The fuel utilization ratio is a ratio of the fuel utilized for the power generation reaction to the fuel supplied from the outside.

In the above fuel cell temperature distribution control system, the control unit may include an oxidizing gas temperature control unit that controls a temperature in the vicinity of a fuel gas supply port to within the preset appropriate temperature range by controlling the temperature of the oxidizing gas.

According to the above configuration, since the temperature in the vicinity (supply part) of the fuel gas supply port is controlled to within the preset predetermined appropriate temperature range by controlling the temperature of the oxidizing gas, it is possible to optimize the operation state of the power generation unit and improve the power generation output. In general, the oxidizing gas serves as a cooling source for the entire power generation unit and affects the temperature of the entire power generation unit in the fuel cell. For this reason, by controlling the temperature of the oxidizing gas, the temperature of the entire power generation unit including the fuel gas supply part can be controlled.

According to a second aspect of the present invention, there is provide a fuel cell including a power generation unit that generates power by causing an oxidizing gas and a fuel gas to react with each other; and the above fuel cell temperature distribution control system.

In a third aspect of the present invention, there is provided A fuel cell temperature distribution control method, the fuel cell including a plurality of cell stacks each including a power generation unit that generates power by causing, in a fuel battery cell formed of a laminate of an air electrode, a solid electrolyte, and a fuel electrode, an oxidizing gas flowing on the air electrode side and a fuel gas flowing on the fuel electrode side to react with each other, the method including a temperature measurement step of measuring a temperature of a fuel gas supply part in the power generation unit; and a control step of, on the basis of a result of measurement performed by the temperature measurement step, controls the temperature of the fuel gas supply part to within a preset appropriate temperature range, to control a temperature distribution state in a fuel gas flow direction in the power generation unit.

Advantageous Effects of Invention

According to the present invention, in the fuel cell, the effect that the operation state can be optimized and the power generation output can be improved is exhibited.

BRIEF DESCRIPTION OF DRAWINGS

FIG. 12 is a view illustrating a flowchart of a fuel utilization ratio control by the temperature distribution control unit according to the embodiment of the present invention.

DESCRIPTION OF EMBODIMENTS

Hereinafter, an embodiment of a fuel cell temperature distribution control system, a fuel cell, and a temperature distribution control method according to the present invention will be described below with reference to the drawings.

In the following, for convenience of description, positional relationships between respective components described using the expressions "up" and "down" with respect to the paper surface indicate a vertically upper side and a vertically lower side, respectively. In the present embodiment, in order to obtain the same effect in an up-down direction and the horizontal direction, the up-down direction on the paper surface may correspond to, for example, the horizontal direction perpendicular to the vertical direction without being necessarily limited to a vertical up-down direction.

In the following, a cylindrical cell stack will be described as an example as a cell stack of a solid oxide fuel cell (SOFC). However, the present invention is not necessarily to this. For example, a flat cell stack may be used. Although a fuel battery cell is formed on a base, an electrode (fuel electrode or air electrode) may be formed thicker instead of the base, and may also serve as the base.

Figure 1:
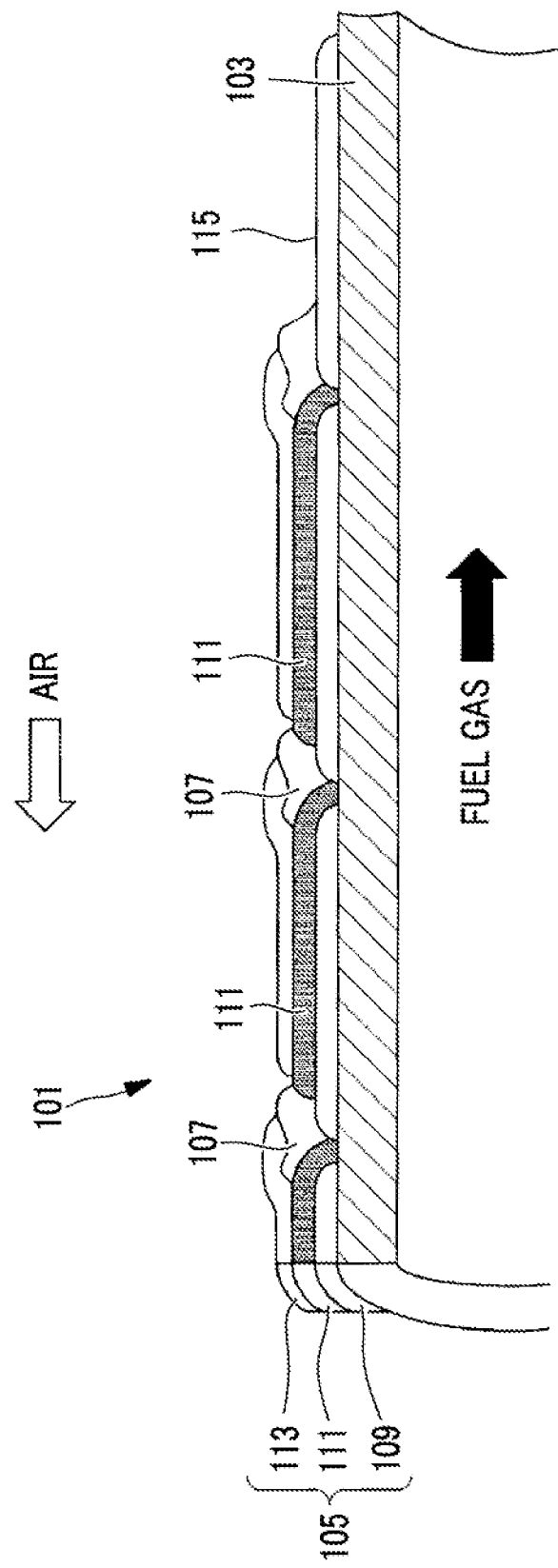
FIG. 1 illustrates one aspect of a cell stack according to an embodiment of the present invention.

First, the cylindrical cell stack using a base pipe will be described as an example according to the present embodiment with reference to FIG. 1. Here, FIG. 1 illustrates one aspect of the cell stack according to the embodiment. A cell stack 101 includes a cylindrical base pipe 103, a plurality of fuel battery cells 105 formed on an outer peripheral surface of the base pipe 103, and an interconnector 107 formed between adjacent fuel battery cells 105. Each fuel battery cell 105 is formed by laminating a fuel electrode 109, a solid electrolyte 111, and an air electrode 113. The cell stack 101 includes a lead film 115 electrically connected via the interconnector 107 connected to the air electrode 113 of the fuel battery cell 105 formed at one end of extreme ends in an axial direction of the base pipe 103 within the plurality of fuel battery cells 105 formed on the outer peripheral surface of the base pipe 103, and a lead film 115 electrically connected to the fuel electrode 109 of the fuel battery cell 105 formed at the other end of the extreme ends.

The base pipe 103 is made of a porous material, having, for example, CaO stabilized $ZrO_2$ (CSZ), a mixture (CSZ+NiO) of CSZ and nickel oxide (NiO), or $Y_2O_3$ stabilized $ZrO_2$ (YSZ), $MgAl_2O_4$, or the like, as a main component. The base pipe 103 supports each fuel battery cell 105, the interconnector 107, and each lead films 115, and diffuses fuel gas, which is supplied to an inner peripheral surface of the base pipe 103, to each fuel electrodes 109 formed on the outer peripheral surface of the base pipe 103 via pores of the base pipe 103.

The fuel electrode 109 is made of an oxide of a composite material of Ni and a zirconia-based electrolyte material, and for example, Ni/YSZ is used. The thickness of the fuel electrode 109 is 50 to 250 μm, and the fuel electrode 109 may be formed by screen printing with a slurry. In this case, the fuel electrode 109 has Ni as a component of the fuel electrode 109 having a catalytic action on the fuel gas. The catalytic action is performed by reacting a mixed gas of the fuel gas, for example, methane ($CH_4$), which is supplied via the base pipe 103, and steam to reform the reacted mixed gas into hydrogen ($H_2$) and carbon monoxide (CO). The fuel electrode 109 electrochemically reacts hydrogen ($H_2$) and carbon monoxide (CO) obtained by reforming and oxygen ions ($O^{2-}$) supplied via the solid electrolyte 111 in the vicinity of an interface with the solid electrolyte 111 to generate water ($H_2O$) and carbon dioxide ($CO_2$). In this case, the fuel battery cell 105 generates power by electrons discharged from the oxygen ions.

The fuel gas that can be supplied to the fuel electrode 109 of the SOFC 10 and used includes gas in which carbonaceous raw materials such as oil, methanol, and coal are produced by a gasification facility, in addition to hydrogen ($H_2$), carbon monoxide (CO), hydrocarbon gas such as methane ($CH_4$), city gas, and natural gas.

As the solid electrolyte 111, YSZ having airtightness that is difficult to pass gas and high oxygen ion conductivity at high temperature is mainly used. The solid electrolyte 111 moves the oxygen ions ($O^{2-}$) generated at the air electrode to the fuel electrode. The film thickness of the solid electrolyte 111 located on the surface of the fuel electrode 109 is 10 to 100 μm, and the solid electrolyte 111 may be formed by screen printing with a slurry.

The air electrode 113 is made of, for example, a LaSrMnO$_3$-based oxide or a LaCoO$_3$-based oxide, and the air electrode 113 is applied by screen printing with a slurry or using a dispenser. The air electrode 113 dissociates oxygen in an oxidizing gas such as supplied air in the vicinity of the interface with the solid electrolyte 111 to generate oxygen ions ($O^{2-}$).

The air electrode 113 may have a two-layer configuration. In this case, an air electrode layer (air electrode intermediate layer) on the solid electrolyte 111 side is made of a material shows high ionic conductivity and having excellent catalytic activity. An air electrode layer (air electrode conductive layer) on the air electrode intermediate layer may be made of a perovskite oxide represented by Sr and Ca-doped LaMnO$_3$. By doing so, the power generation performance can be further improved.

The oxidizing gas is a gas containing approximately 15% to 30% of oxygen. Typically, air is suitable. However, in addition to air, a mixed gas of combusted exhaust gas and air, a mixed gas of oxygen and air, or the like can be used.

The interconnector 107 is made of a conductive perovskite oxide represented by $M_{1-x}L_xTiO_3$ (M is an alkaline earth metal element, L is a lanthanoid element) such as SrTiO$_3$, and is screen-printed with slurry. The interconnector 107 is a film that is dense such that the fuel gas and the oxidizing gas do not mix with each other. The interconnector 107 has stable durability and electrical conductivity under both atmospheres or an oxidizing atmosphere and a reducing atmosphere. The interconnector 107 electrically connects the air electrode 113 of one fuel battery cell 105 and the fuel electrode 109 of the other fuel battery cell 105 to each other in adjacent fuel battery cells 105, and connects the adjacent fuel battery cells 105 to each other in series.

Since the lead film 115 needs to have electron conductivity and to have a thermal expansion coefficient close to other materials constituting the cell stack 101, the lead film 115 is made of a composite material of Ni and a zirconia-based electrolyte material such as Ni/YSZ or $M_{1-x}L_xTiO_3$ (M is an alkaline earth metal element and L is a lanthanoid element) such as SrTiO$_3$ system. The lead film 115 leads DC power generated by the plurality of fuel battery cells 105 connected in series by the interconnector to the vicinity of the end of the cell stack 101.

Figure 2:
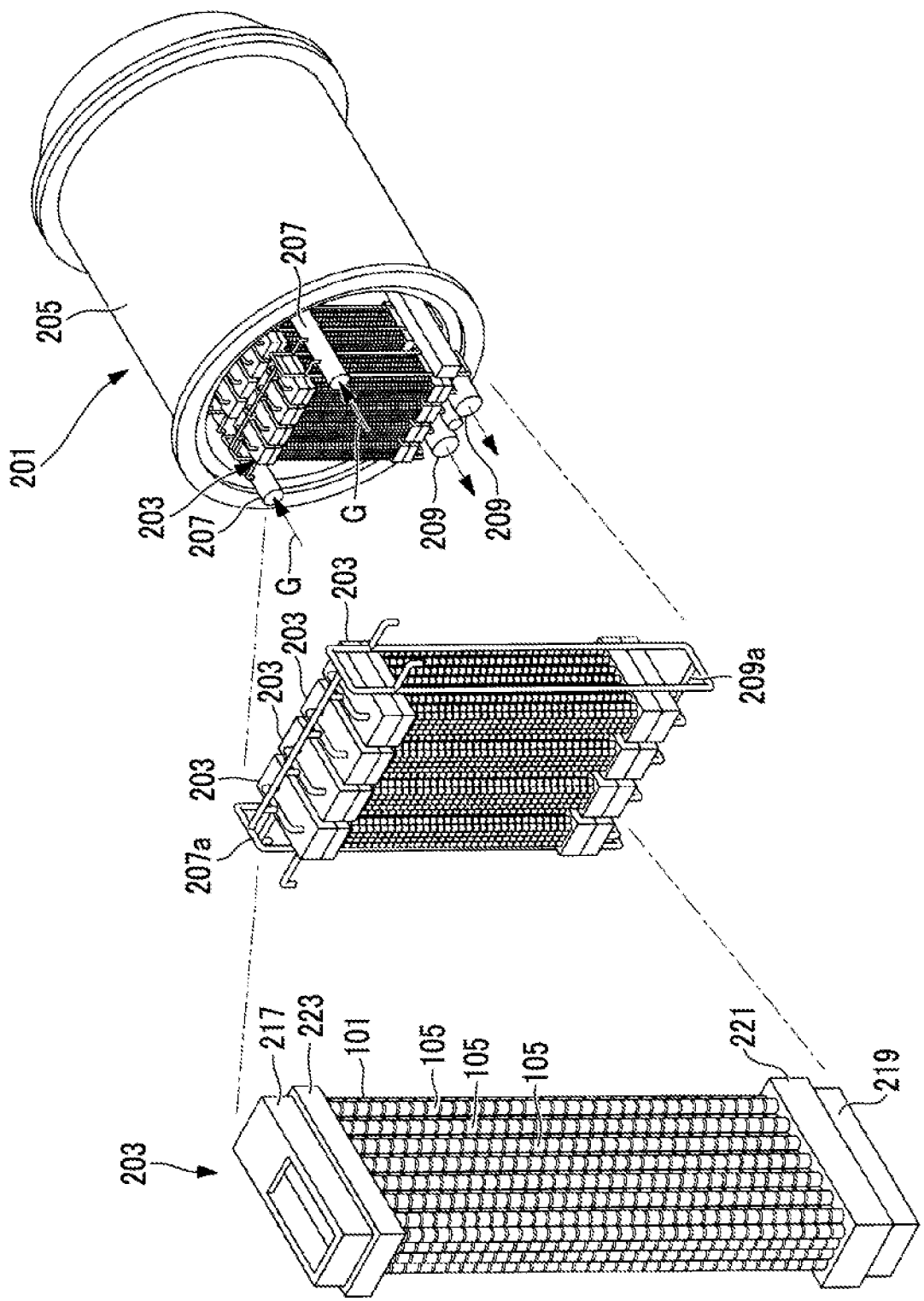
FIG. 2 illustrates one aspect of an SOFC module according to the embodiment of the present invention.
Figure 3:
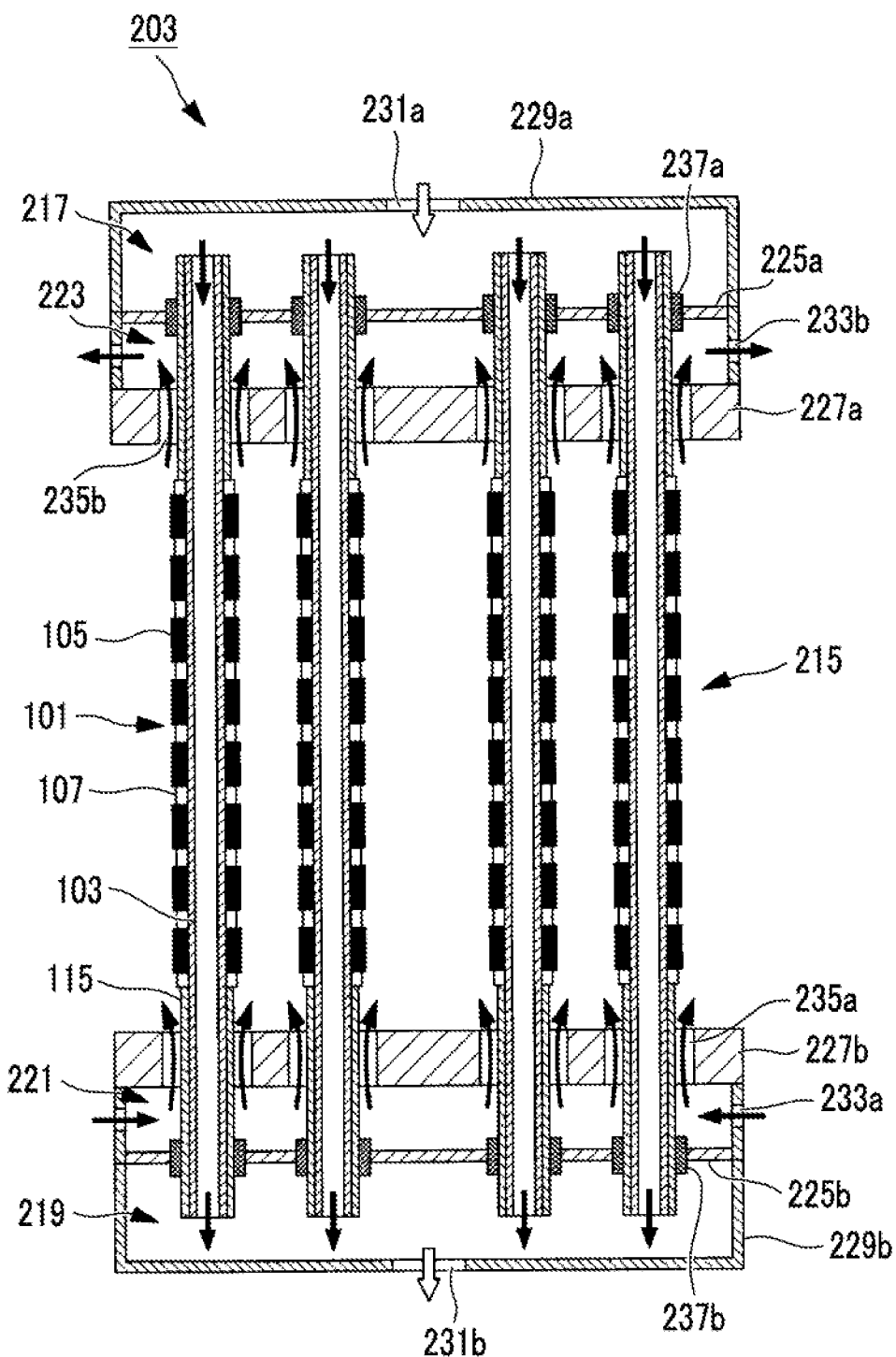
FIG. 3 illustrates one aspect of a cross section of an SOFC cartridge according to the embodiment of the present invention.

Next, the SOFC module and the SOFC cartridge according to the present embodiment will be described with reference to FIGS. 2 and 3. Here, FIG. 2 illustrates one aspect of the SOFC module according to the embodiment. FIG. 3 is a cross-sectional view of one aspect of the SOFC cartridge according to the embodiment.

As illustrated in FIG. 2, the SOFC module 201 includes, for example, a plurality of SOFC cartridges 203 and a pressure vessel 205 that stores the plurality of SOFC cartridges 203. FIG. 2 illustrates the cylindrical SOFC cell stack. However, the present invention is not necessarily limited to this. For example, a flat cell stack may be used. The SOFC module 201 includes a fuel gas supply pipe 207, a plurality of fuel gas supply branch pipes 207a, a fuel gas discharge pipe 209, and a plurality of fuel gas discharge branch pipes 209a. The SOFC module 201 includes an oxidizing gas supply pipe (not illustrated), an oxidizing gas supply branch pine (not illustrated), an oxidizing gas discharge pipe (not illustrated), and a plurality of oxidizing gas discharge branch pipes (not illustrated).

The fuel gas supply pipe 207 is provided outside the pressure vessel 205, is connected to a fuel gas supply part that supplies a predetermined gas composition and a predetermined flow rate of fuel gas corresponding to the amount of power generation of the SOFC module 201, and is connected to the plurality of fuel gas supply branch pipes 207a. The fuel gas supply pipe 207 branches and guides a predetermined flow rate of the fuel gas, which is supplied from the above-described fuel gas supply part, to the plurality of fuel gas supply branch pipes 207a. The fuel gas supply branch pipes 207a are connected to the fuel gas supply pipe 207 and to the plurality of SOFC cartridges 203. The fuel gas supply branch pipes 207a guide the fuel gas, which is supplied from the fuel gas supply pipe 207, to the plurality of SOFC cartridges 203 at a substantially equal flow rate, and makes the power generation performance of the plurality of SOFC cartridges 203 substantially uniform.

The fuel gas discharge branch pipes 209a are connected to the plurality of SOFC cartridges 203 and to the fuel gas discharge pipe 209. The fuel gas discharge branch pipes 209a guide the exhaust fuel gas discharged from the SOFC cartridges 203 to the fuel gas discharge pipe 209. The fuel gas discharge pipe 209 is connected to the plurality of fuel gas discharge branch pipes 209a, and a part of the fuel gas discharge pipe 209 is disposed outside the pressure vessel 205. The fuel gas discharge pipe 209 guides the exhaust fuel gas, which is led from the fuel gas discharge branch pipes 209a at a substantially equal flow rate, to the outside of the pressure vessel 205.

Since the pressure vessel 205 is operated at an internal pressure of 0.1 MPa to about 3 MPa and an internal temperature of the atmospheric temperature to about 550° C., a material having a proof stress and a corrosion resistance to an oxidizing agent such as oxygen contained in the oxidizing gas is used. For example, a stainless steel material such as SUS304 is suitable.

Here, in the present embodiment, the aspect in which the plurality of SOFC cartridges 203 are assembled and stored in the pressure vessel 205 is described. However, the present invention is not limited to this. For example, an aspect in which the SOFC cartridges 203 are stored within the pressure vessel 205 can also be adopted.

As illustrated in FIG. 3, each SOFC cartridge 203 includes a plurality of the cell stacks 101, a power generation chamber 215, a fuel gas supply chamber 217, a fuel gas discharge chamber 219, an oxidizing gas supply chamber 221, and an oxidizing gas discharge chamber 223. The SOFC cartridge 203 includes an upper pipe plate 225a, a lower pipe plate 225b, an upper heat insulator 227a, and a lower heat insulator 227b. In the present embodiment, the SOFC cartridge 203 is configured such that the fuel gas supply chamber 217, the fuel gas discharge chamber 219, the oxidizing gas supply chamber 221, and the oxidizing gas discharge chamber 223 are arranged as illustrated in FIG. 3, and thereby, has a structure in which the fuel gas and the oxidizing gas flow in opposite directions inside and outside the cell stack 101. However, this is not necessarily. For example, the fuel gas and the oxidizing gas may flow in parallel inside and outside the cell stack, or the oxidizing gas may flow in a direction perpendicular to the longitudinal direction of the cell stack.

The power generation chamber 215 is a region formed between the upper heat insulator 227a and the lower heat insulator 227b. The power generation chamber 215 is a region where the fuel battery cells 105 of the cell stack 101 are arranged, and is a region where power is generated by electrochemically reacting the fuel gas and the oxidizing gas. The temperature in the vicinity of a central part of the power generation chamber 215 in the longitudinal direction of the cell stack 101 is monitored by a temperature measurement unit (a temperature sensor, a thermocouple, or the like), and is in a high-temperature atmosphere of about 700° to 1000° C. when the SOFC module 201 is in a steady operation.

The fuel gas supply chamber 217 is a region surrounded by an upper casing 229a and an upper pipe plate 225a of the SOFC cartridge 203, and communicates with the fuel gas supply branch pipes 207a by a fuel gas supply hole 231a provided in an upper portion of the upper casing 229a. The plurality of cell stacks 101 are joined to the upper pipe plate 225a by seal members 237a, and the fuel gas supply chamber 217 guides the fuel gas, which is supplied from the fuel gas supply branch pipes 207a via the fuel gas supply hole 231a, into the base pipes 103 of the plurality of cell stacks 101 at a substantially uniform flow rate, and the power generation performance of the plurality of cell stacks 101 is made substantially uniform.

The fuel gas discharge chamber 219 is a region surrounded by a lower casing 229b and a lower pipe plate 225b of the SOFC cartridges 203, and communicates with the fuel gas discharge branch pipes 209a by a fuel gas discharge hole 231b provided in the lower casing 229b. The plurality of cell stacks 101 are joined to a lower pipe plate 225b by seal members 237b, and the fuel gas discharge chamber 219 passes through the base pipes 103 of the plurality of cell stacks 101, collect the exhaust fuel gas supplied to the fuel gas discharge chamber 219, and guide the collected exhaust fuel gas to the fuel gas discharge branch pipes 209a via a fuel gas discharge hole 231b.

The oxidizing gas having a predetermined gas composition and a predetermined flow rate corresponding to the amount of power generation of the SOFC module 201 is branched into the oxidizing gas supply branch pipe and supplied to the plurality of SOFC cartridges 203. The oxidizing gas supply chamber 221 is a region surrounded by the lower casing 229b, the lower pipe plate 225b, and the lower heat insulator 227b of the SOFC cartridge 203, and communicates with the oxidizing gas supply branch pipe (not illustrated) by an oxidizing gas supply hole 233a provided on a side surface of the lower casing 229b. The oxidizing gas supply chamber 221 guides a predetermined flow rate of the oxidizing gas, which is supplied from the oxidizing gas supply branch pipe (not illustrated) via the oxidizing gas supply hole 233a, to the power generation chamber 215 via an oxidizing gas supply gap 235a to be described below.

The oxidizing gas discharge chamber 223 is a region surrounded by the upper casing 229a, the upper pipe plate 225a, and the upper heat insulator 227a of the SOFC cartridge 203, and communicates the oxidizing gas discharge branch pipes (not illustrated) by an oxidizing gas discharge hole 233b provided on a side surface of the upper casing 229a. The oxidizing gas discharge chamber 223 guides the exhaust oxidizing gas, which is supplied from the power generation chamber 15 to the oxidizing gas discharge chamber 223 via an oxidizing gas discharge gap 235b to be described below, to the oxidizing gas discharge branch pipes (not illustrated) via the oxidizing gas discharge hole 233b.

The upper pipe plate 225a is fixed to a side plate of the upper casing 229a between a top plate of the upper casing 229a and the upper heat insulator 227a such that the upper pipe plate 225a, the top plate of the upper casing 229a, and the upper heat insulator 227a are substantially parallel to each other. Additionally, the upper pipe plate 225a has a plurality of holes corresponding to the number of the cell stacks 101 provided in the SOFC cartridge 203, and the cell stacks 101 are respectively inserted into the holes. The upper pipe plate 225a airtightly supports one end of each of the plurality of cell stacks 101 via one or both of a sealing member and an adhesive member, and isolate the fuel gas supply chamber 217 and the oxidizing gas discharge chamber 223 from each other.

The upper heat insulator 227a is disposed at a lower end of the upper casing 229a such that the upper heat insulator 227a, the top plate of the upper casing 229a, and the upper pipe plate 225a are substantially parallel to each other, and is fixed to a side plate of the upper casing 229a. The upper heat insulator 227a is provided with a plurality of holes corresponding to the number of the cell stacks 101 provided in the SOFC cartridge 203. The diameter of each hole set to be larger than the outer diameter of each cell stack 101. The upper heat insulator 227a includes the oxidizing gas discharge gap 235b formed between an inner surface of the hole and an outer surface of the cell stack 101 inserted through the upper heat insulator 227a.

The upper heat insulator 227a partitions the power generation chamber 215 and the oxidizing gas discharge chamber 223 from each other, and suppresses that the atmosphere around the upper pipe plate 225a has high temperature, and thereby the strength is reduced and corrosion by the oxidizing agent contained n the oxidizing gas is increased. The upper pipe plate 225a and the like are made of a high-temperature durable metallic material such as Inconel. This prevents the upper pipe plate 225a and the like from being thermally deformed by being exposed to the high temperature inside the power generation chamber 215 and increasing a temperature difference inside the upper pipe plate 225a and the like. The upper heat insulator 227a guides the exhaust oxidizing gas, which has passed through the rower generation chamber 215 and has been exposed to a high temperature, to the oxidizing gas discharge chamber 223 through the oxidizing gas discharge gap 235b.

According to the present embodiment, due to the structure of the above-described SOFC cartridge 203, the fuel gas and the oxidizing gas flow in opposite directions inside and outside the cell stack 131. Accordingly, the exhaust oxidizing gas exchanges heat with the fuel gas supplied to the power generation chamber 215 through the inside of the base pipe 103, is cooled to a temperature at which the upper pipe plate 225a made of a metallic material does not undergoes deformation such as buckling, and is supplied to the oxidizing gas discharge chamber 223. The fuel gas is raised in temperature by heat exchange with the exhaust oxidizing gas discharged from the power generation chamber 215, and is supplied to the power generation chamber 215. As a result, the fuel gas preheated and raised in temperature to a temperature suitable for power generation without using a heater or the like can be supplied to the power generation chamber 215.

The lower pipe plate 225b is fixed to a side plate of the lower casing 229b between a bottom plate of the lower casing 229b and the lower heat insulator 227b such that the lower pipe plate 225b, the bottom plate of the lower casing 229b, and the lower heat insulator 227b are substantially parallel to each other. Additionally, the lower pipe plate 225b has a plurality of holes corresponding to the number of the cell stacks 101 provided in the SOFC cartridge 203, and the cell stacks 101 are respectively inserted into the holes. The lower pipe plate 225b airtightly supports the other end of each off the plurality of cell stacks 101 via one or both of a seal member and an adhesive member, and also isolate the fuel gas discharge chamber 219 and the oxidizing gas supply chamber 221 from each other.

The lower heat insulator 227b is disposed at an upper end of the lower casing 229b such that the lower heat insulator 227b, the bottom plate of the lower casing 229b, and the lower pipe plate 225b are substantially parallel to each other, and is fixed to the side plate of the lower casing 229b. The lower heat insulator 227b is provided with a plurality of holes corresponding to the number of the cell stacks 101 provided in the SOFC cartridge 203. The diameter of each hole is set to be larger than the outer diameter of each cell stack 101. The lower heat insulator 227b includes the oxidizing gas supply gap 235a formed between an inner surface of the hole and the outer surface of the cell stack 101 inserted through the lower heat insulator 227b.

The lower heat insulator 227b partitions the power generation chamber 215 and the oxidizing gas supply chamber 221 from each other, and suppresses that the atmosphere around the lower pipe plate 225b has high temperature, and thereby the strength is lowered and corrosion by the oxidizing agent contained in the oxidizing gas is increased. The lower pipe plate 225b and the like are made of a high-temperature durable metallic material such as Inconel. This prevents the lower pipe plate 225b and the like from being thermally deformed by being exposed to a high temperature and increasing a temperature difference inside the lower pipe plate 225b and the like. The lower heat insulator 227 b guides the oxidizing gas, which is supplied to the oxidizing gas supply chamber 221, to the power generation chamber 215 through the oxidizing gas supply gap 235a.

According to the present embodiment, due to the structure of the above-described SOFC cartridge 203, the fuel gas and the oxidizing gas flow in opposite directions inside and outside the cell stack 101. Accordingly, the exhaust fuel gas, which has passed through the power generation chamber 215 through the inside of the base pipe 103, exchanges heat with the oxidizing gas supplied to the power generation chamber 215, is cooled to a temperature at which the lower pipe plate 225b made of a metallic material does not undergoes deformation such as buckling, and is supplied to the fuel gas discharge chamber 219. The oxidizing gas is raised in temperature by heat exchange with the exhaust fuel gas, and is supplied to the power generation chamber 215. As a result, the oxidizing gas raised in temperature to a temperature required for power generation without using a heater or the like can be supplied to the power generation chamber 215.

The DC power generated in the power generation chamber 215 is led out to the vicinity of the end of the cell stack 101 by the lead film 115 made of Ni/YSZ or the like provided on the plurality of fuel battery cells 105, and then, power is collected in a collector rod (not illustrated) of the SOFC cartridge 203 via a collector plate (not illustrated) and is taken out of each SOFC cartridge 203. The DC Dower led out of the SOFC cartridge 203 by the collector rod connects the generated power of each SOFC cartridge 203 to a predetermined serial number and a parallel number, is led out of the SOFC module 201, is converted into predetermined AC power by a power conversion device (such as an inverter) such as a power conditioner (not illustrated), and is supplied to a power supply destination (for example, a load facility or a power system).

A schematic configuration of a power generation system according to the embodiment of the present invention will be described.

Figure 4:
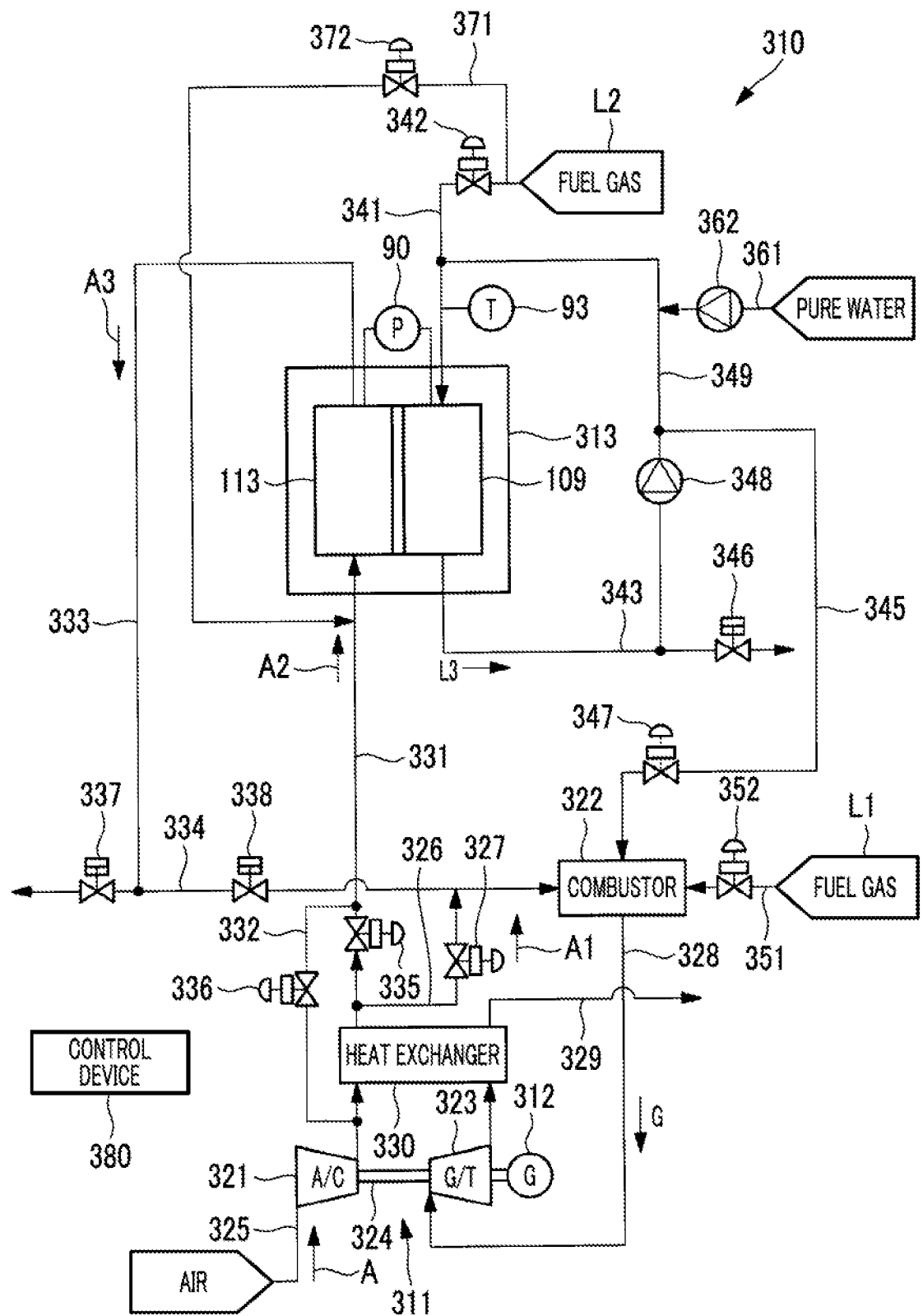
FIG. 4 illustrates one aspect of a power generation system according to the embodiment of the present invention.

FIG. 4 is a schematic configuration diagram illustrating a schematic configuration of a combined power generation system (hereinafter, referred to as a "power generation system") 310 according to an embodiment of the present invention. As illustrated in FIG. 4, the power generation system 310 includes a micro gas turbine (hereinafter, referred to as "MGT") 311, a generator 312, an SOFC 313 (fuel cell 313), and a control device 380. The SOFC 313 is configured by combining one or more SOFC modules (not illustrated), and is hereinafter simply referred to as "SOFC". The power generation system 310 is configured to obtain high power generation efficiency by combining the power generation by the MGT 311 with the power generation by the SOFC 313. In addition, in the present embodiment, a system using the micro gas turbine (MGT) 311 is described. However, a turbocharger may be used instead of the MGT 311. The MGT 311 rotates the turbine 323 with the combustion gas G, performs compression of air A by a compressor 321 and generation of power by the generator 312, and recovers the energy of the combustion gas G. Additionally, in the turbocharger (not illustrated), the turbine 323 is rotated by the combustion gas G, the compression of the air A by the compressor 321 is performed, and the energy of the combustion gas G is recovered.

The MGT 311 includes the compressor 321, a combustor 322, and the turbine 323, and the compressor 321 and the turbine 323 are coupled to each other by a rotating shaft 324 so as to be integrally rotatable. The compressor 321 is rotationally driven by rotation of the turbine 323 to be described below. The compressor 321 compresses the air A taken in from an air intake line 325.

Air A1, which is at least a art of the air A from the compressor 321, is supplied to the combustor 322 via first oxidizing gas supply line 326, and fuel gas L1 is supplied to the combustor 322 via a first fuel gas supply line 351. The first oxidizing gas supply line 326 is provided with a control valve 327 for adjusting the amount of air A1 to be supplied to the combustor 322, and the first fuel gas supply line 351 is provided with a control valve 352 for adjusting the flow rate of the fuel gas to be suppled to the combustor 322. Moreover, a part of an exhaust fuel gas L3 circulating through a fuel gas recirculation line 349 of the SOFC 313 to be described below is supplied to the combustor 322 through an exhaust fuel gas supply line 345. The exhaust fuel gas supply line 345 is provided with a control valve 347 for adjusting the amount of the exhaust fuel gas supplied to the combustor 322. Moreover, part of exhaust air A3 used in the air electrode 113 of the SOFC 313 is supplied to the combustor 322 through an exhaust oxidizing gas supply line 334 to be described below.

The combustor 322 mixes and combusts the fuel gas L1, a part (air A1) of the air A, the exhaust fuel gas L3, and the exhaust air A3 to generate the combustion gas G. The combustion gas G is supplied to the turbine 323 through the combustion gas supply line 328. The turbine 323 is rotated by the adiabatic expansion of the combustion gas G, and the exhaust as is discharged from a combusted exhaust gas line 329.

The generator 312 is provided coaxially with the turbine 323, and generates power by rotationally driving the turbine 323.

The fuel gas L1 and a fuel gas L2 (to be described below to be supplied to the combustor 322 are combustible gases. For example, a gas obtained by vaporizing liquefied natural gas (LNG), or natural gas, city gas, hydrogen ($H_2$), carbon monoxide (CO), hydrocarbon gases such as methane ($CH_4$), and gases produced by gasification facilities for carbonaceous raw materials (oil, coal, and the like) are used. The fuel gas mean a fuel gas whose calorific value has been adjusted to be substantially constant in advance.

The heat exchanger 330 exchanges heat between the exhaust gas discharged from the turbine 323 and the air A suppled from the compressor 321. After being cooled by the heat exchange with the air A, the exhaust gas is discharged to the outside through a chimney (not illustrated).

The SOFC 313 generates power by reacting at a predetermined operating temperature by supplying the fuel gas L2 as a reducing agent and the air A as the oxidizing agent. The SOFC 313 includes an SOFC module (not illustrated), and houses an assembly of a plurality of cell stacks provided in a pressure vessel of the SOFC module, and each cell stack (not illustrated) is provided with the fuel electrode 109, the air electrode 113, and the solid electrolyte 111.

The SOFC 313 generates power by supplying the air A2 to the air electrode 113 and supplying the fuel gas L2 to the fuel electrode 109, and converts the power to a predetermined AC power by the power conversion device (inverter or the like) such as a power conditioner (not illustrated).

In the present embodiment, a case where at least a part of the air A (air A1) compressed by the compressor 321 is adopted as the oxidizing gas supplied to the SOFC 313 will be described as an example.

In the SOFC 313, the air A2 is supplied as the oxidizing gas to an oxidizing gas introduction unit (not illustrated) of the air electrode 113 through a second oxidizing gas supply line 331 branched from the first oxidizing gas supply line 326. The second oxidizing gas supply line 331 is provided with a control valve 335 for adjusting the flow rate of the air A2 to be supplied. In the first oxidizing gas supply line 326, a heat exchanger 330 is provided on the upstream side (in other words, on the compressor 321 side) of the air A2 from a branch point of the second oxidizing gas supply line 331. In the heat exchanger 330, the air A exchanges heat with the exhaust gas discharged from the combusted exhaust gas line 329 and is raised in temperature. Moreover, the second oxidizing gas supply line 331 is provided with a bypass line 332 that bypasses the heat exchanger 330. A control valve 336 is provided in the bypass line 332 so that the bypass flow rate of the air A can be adjusted. By controlling the opening degree of the control valves 335 and 336 by a control device 380 to be described below, the flow rate ratio between the air A passing through the heat exchanger 330 and the air A bypassing the heat exchanger 330 is adjusted, and the temperature of the air A2 supplied to the SOFC 313 through the second oxidizing gas supply line 331, which is a part of the above, is adjusted. An upper limit of the temperature of the air A2 supplied to the SOFC 313 is limited so as not to damage the materials of the components inside the SOFC module (not illustrated) constituting the SOFC 313.

Moreover, an air electrode fuel supply line 371 for supplying the fuel gas L2 as the combustible gas is connected to the second oxidizing gas supply line 331. The air electrode fuel supply line 371 is provided with a control valve 372 for adjusting the amount of fuel gas supplied to the second oxidizing gas supply line 331. The supply amount of the fuel gas L2 added to the air A2 is adjusted by controlling the valve opening degree of the control valve 372 by the control device 380 to be described below. The amount of the fuel gas L2 added to the air A2 is supplied at a flammable limit concentration or lower, and is more preferably supplied at 3% by volume or lower.

The SOFC 313 is connected to an exhaust oxidizing gas emission line 333 that emits the exhaust air A3 used in the air electrode 113. The exhaust oxidizing gas supply line 334 for supplying the exhaust air A3 to the combustor 322 is connected to the exhaust oxidizing gas emission line 333. The exhaust oxidizing gas supply line 334 is provided with a shut-off valve 338 for cutting off a system between the SOFC 313 and the MGT 311.

The exhaust oxidizing gas discharge line 333 is provided with a control valve (or shut-off valve) 337 for adjusting the amount of exhaust oxidizing gas for emitting the exhaust air A3 used in the air electrode 113 to the outside of the system.

A second fuel gas supply line 341 that supplies the fuel gas L2 to a fuel gas inlet (not illustrated) of the fuel electrode 109, and an exhaust fuel gas line 343 that emits an exhaust fuel gas L3 used for the reaction in the fuel electrode 109 are further connected to the SOFC 313. The second fuel gas supply line 341 is provided with a control valve 342 for adjusting the flow rate of the fuel gas L2 supplied to the fuel electrode 109, and the exhaust fuel gas line 343 is provided with a control valve (or shut-off valve) 346 for adjusting the amount of exhaust fuel gas for emitting the exhaust fuel gas L3 after used in the reaction at the fuel electrode 109 to the outside of the system. By controlling a control valve 346 of the exhaust fuel gas line 343 and a control valve 337 of the exhaust oxidizing gas discharge line 333, an excessive pressure can be quickly adjusted by emitting the exhaust fuel gas L3 or the exhaust air A3 to the outside of the system. The differential pressure between the fuel electrode 109 and the air electrode 113 of the SOFC 313 (hereinafter referred to as fuel air differential pressure) is controlled by the control valve 347 so as to be higher in a predetermined pressure range on the fuel electrode 109 side. A fuel gas recirculation line 349 for recirculating the exhaust fuel gas L3 to the fuel gas inlet of the fuel electrode 109 of the SOFC 313 is connected to the exhaust fuel gas line 343. The fuel gas recirculation line 349 is provided with a recirculation blower 348 for recirculating the exhaust fuel gas L3. That is, the fuel gas supplied to the SOFC 313 is a mixed gas of the fuel gas L2 (combustible gas) supplied via the second fuel gas supply line 341 and the exhaust fuel gas L3 supplied via the fuel gas recirculation line 349.

Moreover, the fuel gas recirculation line 349 is provided with a pure water supply line 361 that supplies pure water for reforming the fuel gas L2 to the fuel electrode 109. The pure water supply line 361 is provided with a pump 362. By controlling the discharge flow rate of the pump 362 by the control device 380, the amount of pure water supplied to the fuel electrode 109 is adjusted.

The molar ratio of steam to carbon in the fuel gas is referred to as S/C (steam carbon ratio). In the vicinity of a system inlet of the SOFC 313 on the fuel electrode 109 side, the S/C needs to be stoichiometrically 1.0 or more in order to perform internal reforming of the fuel. Moreover, if there is a region where the S/C is lower in the vicinity or a cell stack (not illustrated), there is a risk that carbon precipitates. It is preferable that S/C≥3.0 in order to prevent carbon precipitation and promote the reforming rate. On the other hand, if the S/C is too large, the steam content in the exhaust gas finally discharged to the outside of the power generation system 310 increases, and the latent heat component is discharged to the outside as a wasteful amount of heat and the system efficiency decreases. For this reason, it is desirable to be able to set an appropriate amount of S/C that does not become excessive in accordance with the operation state of the S/C. During the rated operation of the SOFC 313, for example, the S/C is set to be 3.0 to 5.0, preferably, 3.5 to 5.0.

In a case where the recirculation of the exhaust fuel gas L3 via the fuel gas recirculation line 349 is performed, when the S/C of the fuel gas L2 supplied to the SOFC 313 by the second fuel gas supply line 341 is lower than a specified value, the pure water is supplied to the second fuel gas supply line 341 via the pure water supply line 361, and the pure water is supplied as steam in the second fuel gas supply line 341 to compensate for the insufficient steam. If the flow rate of the fuel gas L2 supplied with respect to the recirculation flow rate is small, such as when the SOFC is started or stopped, the S/C becomes relatively high. Therefore, the fuel gas L2 supplied to the SOFC 313 may be increased or the amount of pure water may be reduced.

The control device 380 controls each shut-off valve and each flow regulating valve on the basis of, for example, measured values of a pressure gauge, each temperature measurement unit, a flow meter, and the like provided in the power generation system (combined power generation system) 310. Specifically, the control device 380 performs control of starting and stopping of the power generation system 310 and optimization control of the operation state of the SOFC.

The control device 380 includes, for example, a central processing unit (CPU), a random access memory (RAM), a read only memory (ROM), a computer-readable storage medium, and the like. Also, a series of processing for realizing various functions is stored in a storage medium or the like in the form of a program as an example, and the CPU reads the program into the RAM or the like, and executes information processing and arithmetic processing, thereby realizing various functions. A form in which the program is installed in advance in the ROM or other storage medium, a form in which the program is provided in a state of being stored in the computer-readable storage medium, or a form in which the program is distributed via wired or wireless communication means may be applied. The computer-readable storage medium is a magnetic disk, a magneto-optical disk, a CD-ROM, a DVD-ROM, a semiconductor memory, or the like.

Figure 5:
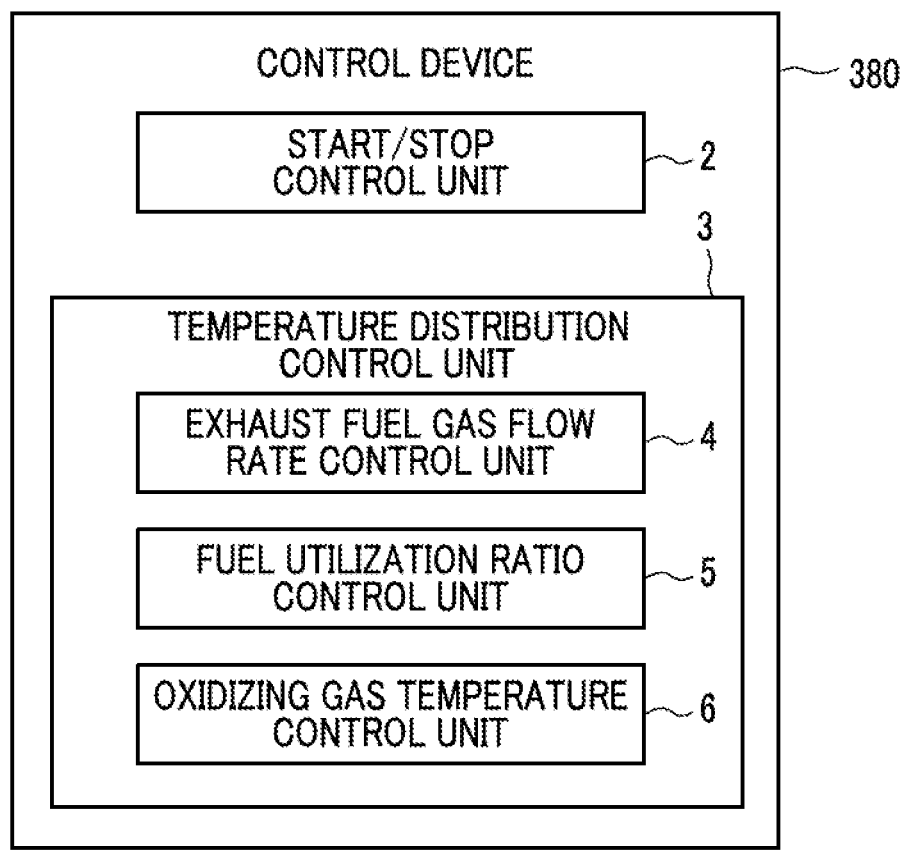
FIG. 5, is a functional block diagram illustrating functions included in a control device in the power generation system according to the embodiment of the present invention.

FIG. 5 is a functional block diagram illustrating functions included in the control device 380. As illustrated in FIG. 5, the control device 380 includes a start/stop control unit 2 and a temperature distribution control unit 3.

The start/stop control unit 2 controls the start and stop of the power generation system 310. Specifically, in a case where the power generation system 310 is started, the start/stop control unit 2 starts the SOFC 313 after the MGT 311 is started. Details of the start and the stop of the power generation system 310 will be described below.

Figure 6:
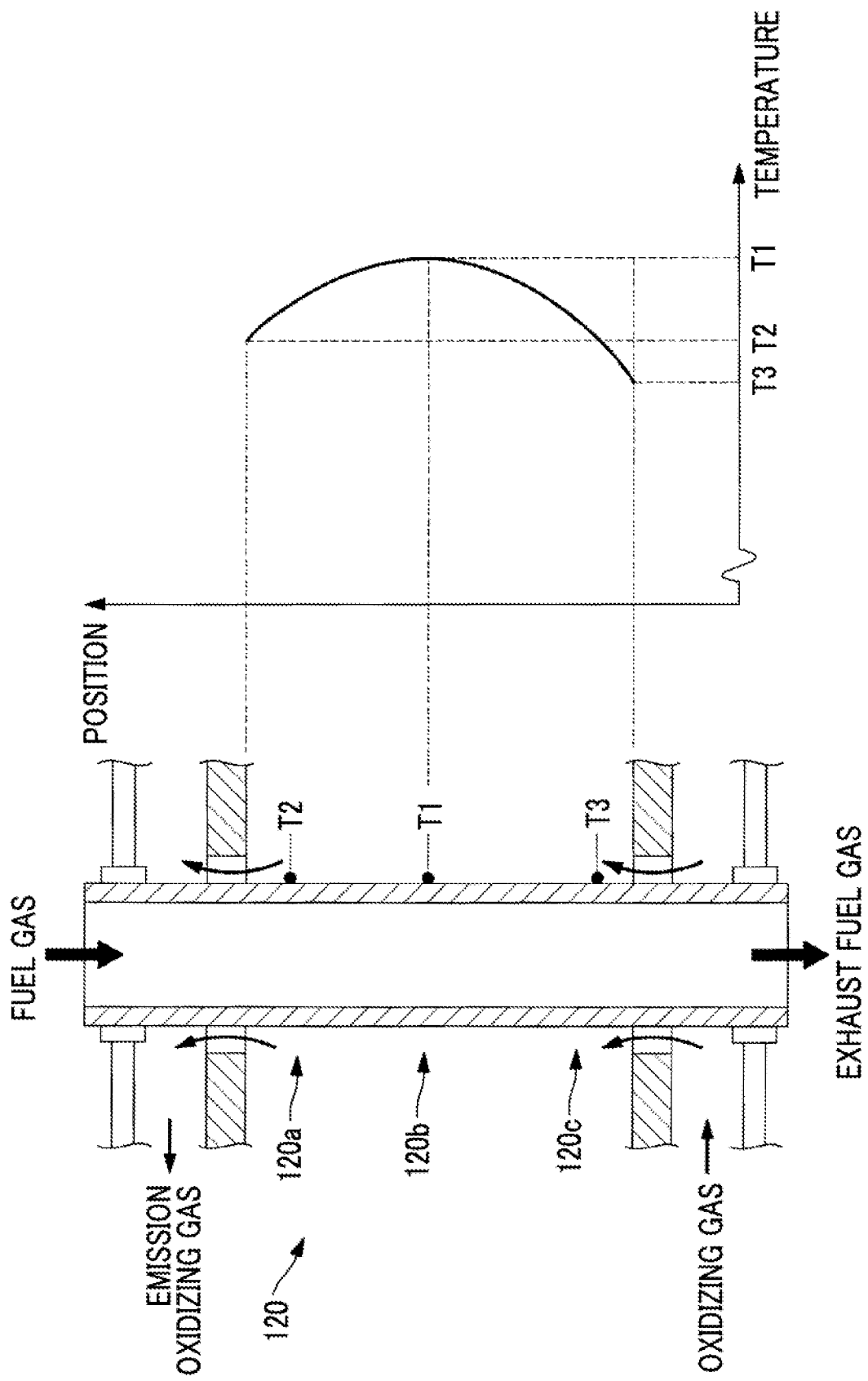
FIG. 6 is a view illustrating a temperature distribution state in the cell stack of the power generation system according to the embodiment of the present invention.

FIG. 6 illustrates a temperature distribution state in the power generation region 120 of the cell stack 101 of the power generation system 310. The cell stack 101 has the power generation region (power generation unit) 120 in which the fuel battery cells 105 are arranged. A fuel gas supply part 120a is provided at one end of the power generation region 120 on the fuel gas supply side, a central part 120b is provided in the vicinity of the center of the power generation region 120 the longitudinal direction, and a fuel gas discharge part 120c is provided at the other end of the power generation region 12 on the fuel gas discharge side.

The temperature distribution control unit 3 (refer to FIG. 5) controls the temperature distribution state of the power generation region 120 in a fuel gas flow direction (longitudinal direction) in the entire cell stack 101 by controlling the temperature T2 of the fuel gas supply part 120a to within a preset predetermined appropriate temperature range, on the basis of the measurement result of the temperature 12 of the fuel gas supply part 120a of the power generation region 120 in the cell stack 101 by the temperature measurement unit. For this reason, the temperature distribution control unit 3 includes an exhaust fuel gas flow rate control unit 4, a fuel utilization ratio control unit 5, and an oxidizing gas temperature control unit 6. The fuel gas supply part 120a of the power generation region 120 of the cell stack 101 is, in other words, a region on the upstream side of a fuel gas flow in the region where the fuel battery cells 105 of the cell stack 101 are arranged (preferably a region on the most upstream side). In the present embodiment, the fuel gas supply part 120a is a region in the vicinity of the upper heat insulator 227a within the power generation chamber 215 (or may be a region in the vicinity of the fuel gas supply chamber 217 in the longitudinal direction of the cell stack 101) and is a relatively low temperature atmosphere region in the longitudinal direction of the cell stack 101. The fuel gas discharge part 120c of the power generation region 120 in the cell stack 101 is, in other words, a region on the downstream side of the fuel gas flow in the region where the fuel battery cells 105 of the cell stack 101 are arranged (preferably a region on the most downstream side). In the present embodiment, the fuel gas discharge part 120c is a region in the vicinity of the lower heat insulator 227b within the power generation chamber 215 (or may be a region in the vicinity of the fuel gas discharge chamber 219 in the longitudinal direction of the cell stack 101), and is a relatively low temperature atmosphere region in the longitudinal direction of the cell stack 101. The central part 120b of the power generation region 120 of the cell stack 101 is, in other words, a region including substantially the center in the fuel gas flow direction or the upstream side of the fuel gas flow slightly from substantially the center, in the power generation region 120 where the fuel battery cells 105 of the cell stack 101 are arranged, and is a highest temperature atmosphere region or a relatively high temperature atmosphere region in the longitudinal direction of the power generation region 120.

For example, a plurality of the temperature measurement units may be installed between the SOFC cartridges 203 to measure the temperature. For example, in FIGS. 3 and 6 in the present embodiment, the temperature measuring unit is installed to measure the temperature T2 within the region in the vicinity of the upper heat insulator 227a within the power generation chamber 215 (the temperature of the fuel gas supply part 120a of the power generation region 120 in the cell stack 101), and the measurement result by the temperature measurement unit is output to the temperature distribution control unit 3. The temperature measurement unit may be disposed in the plurality of cell stacks 101 in a group of the cell stacks 101 constituting the SOFC module 201, or may be installed at a desired location in the longitudinal direction of the cell stacks between the SOFC cartridges 203 (gap portion) to measure the temperature and output an average value of a plurality of measurement results to the temperature distribution control unit 3. A temperature measurement unit for measuring a temperature T1 (the temperature of the central part 120b of the power generation region 120 of the cell stack 101) and a temperature measurement unit for measuring a temperature T3 (the temperature of the fuel gas discharge part 120c of the power generation region 120 of the cell stack 101) in FIG. 6 are also installed, and measurement results by the temperature measurement units are output to the temperature distribution control unit 3.

The temperature distribution in the power generation region 120 of the cell stack 101 is, for example, an arc-shaped temperature distribution as illustrated in FIG. 6. Specifically, the temperature distribution state of the cell stack 101 in the fuel gas flow direction is an arc-shaped temperature distribution state that is a state in which the temperature T2 of the fuel gas supply part 120a and the temperature T3 of the fuel gas discharge part 120c has dropped with respect to the temperature T1 of the central part 120b of the power generation region 120. The temperature distribution state of the power generation region 120 is mainly a temperature distribution state in the fuel gas flow direction in the power generation region 120 where the fuel battery cells 105 of the cell stack 101 are arranged. In a low-temperature region of the power generation region 120, the reaction between the oxidizing gas and the fuel gas by the fuel battery cells 105 is suppressed, and the cell voltage decreases. That is, in order to improve the power generation output, it is preferable that the temperature distribution state in the power generation region 120 in the fuel gas flow direction in the cell stack 101 is optimized as a whole (the whole is brought into a high-temperature state), and the temperature of the low-temperature region in the power generation region 120 is raised so as to be as close to that of the central part 120b as possible.

In the present embodiment, attention has been paid to the fact that the arc-shared temperature distribution state in the power generation region 120 of the cell stack 101 can be almost uniquely estimated from the temperature T2 of the fuel gas supply part 120a. That is, the temperature distribution state of the entire power generation region 120 is controlled by controlling the temperature of the fuel gas supply part 120a. For this reason, in the present embodiment, the temperature T2 of the fuel gas supply part 120a of the power generation region 120 is controlled by the exhaust fuel gas flow rate control unit 4 (exhaust fuel gas recirculation flow rate control), the fuel utilization ratio control unit 5, and the oxidizing gas temperature control unit 6 included in the temperature distribution control unit 3, and the temperature distribution state of the entire power generation region 120 is optimized. In the present embodiment, the temperature distribution control unit 3 includes the exhaust fuel gas flow rate control unit 4, the fuel utilization ratio control unit 5, and the oxidizing gas temperature control unit 6. However, at least one of the exhaust fuel gas flow rate control unit 4, the fuel utilization ratio control unit 5, and the oxidizing gas temperature control unit 6 may be provided.

The exhaust fuel gas flow rate control unit 4 controlling the temperature 12 of the fuel gas supply part 120a to within the preset appropriate temperature range by increasing or decreasing the flow rate of the exhaust fuel gas (exhaust fuel gas recirculation gas) obtained by recirculating at least a art of the exhaust fuel gas L3 of the exhaust fuel gas line 343 discharged from the fuel electrode 109 side of the SOFC 313, to the fuel gas supply part 120a of the SOFC 313, thereby (exhaust fuel gas flow rate control) Specifically, the exhaust fuel gas flow rate control unit 4 controls the recirculation flow rate of the exhaust fuel gas supplied to the SOFC (each cell stack 101) via the fuel gas recirculation line 349 by controlling the air supply capacity (such as rotational speed) of the recirculation blower 348 provided in the fuel gas recirculation line 349. The exhaust fuel gas is a gas after a power generation reaction has been performed in the SOFC, but includes a combustible gas (for example, methane ($CH_4$) or the like) that has not contributed to the power generation reaction in each cell stack 101. For this reason in the vicinity of the fuel gas supply part 120a (mainly, in the region on the upstream side of the fuel gas flow in the region of the power generation region 120 of the cell stack 101 where the fuel battery cells 105 are arranged), the temperature decreases due to the heat absorption action accompanying the reforming reaction of the fuel gas and the combustible gas contained in the exhaust fuel gas recirculation gas. That is, since the increase or decrease in the recirculation flow rate of the exhaust fuel gas affects the heat absorption action due to the reforming reaction, the temperature T2 of the fuel gas supply part 120a and the recirculation flow rate of the exhaust fuel gas supplied via the fuel gas recirculation line 349 has a correlation. For this reason, the temperature T2 of the fuel gas supply part 120a can be adjusted by controlling the recirculation flow rate of the exhaust fuel gas. For example, by reducing the recirculation flow rate of the exhaust fuel gas, the reforming reaction of the recirculation gas of the exhaust fuel gas, that is, the heat absorption action can be suppressed, and the temperature T2 of the fuel gas supply part 120a can be increased.

Figure 7:
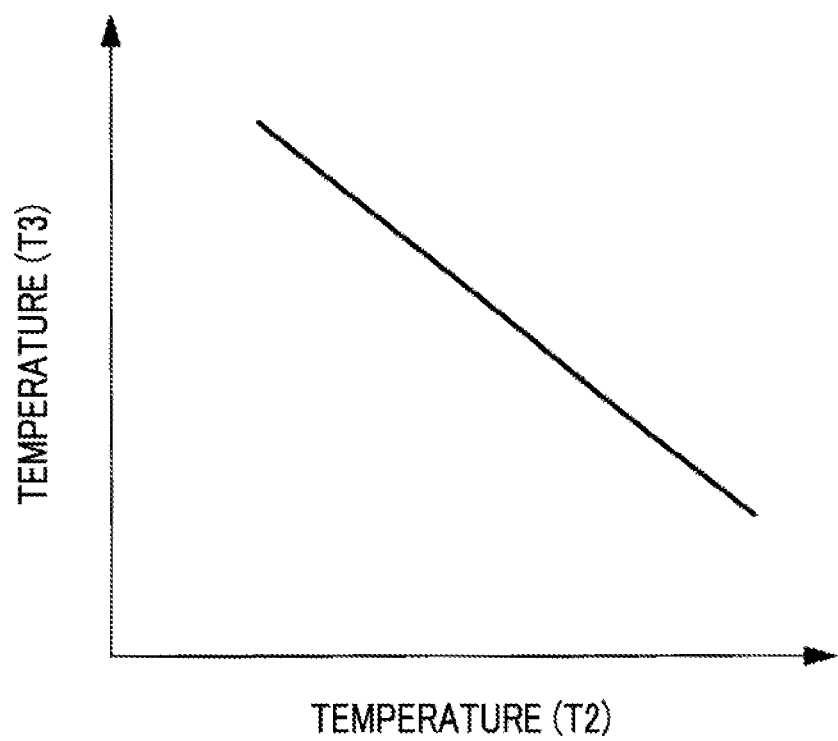
FIG. 7 is a view illustrating a relationship between a temperature T2 and a temperature T3 in the cell stack in an exhaust fuel gas flow rate control and a fuel utilization ratio control according to the power generation system according to the embodiment of the present invention (in a case where the flow rate is equal to or more than a certain value).

However, if the recirculation flowrate of the exhaust fuel gas is excessively decreased in order to raise the temperature T2 of the fuel gas supply part 120a of the power generation region 120 in the cell stack 101, the temperature of the fuel gas discharge part 120c decreases. Specifically, in a case where the recirculation flow rate of the exhaust fuel gas is lowered to a certain value or less, the temperature T2 of the fuel gas supply part 120a rises as illustrated in FIG. 7, but the temperature T3 of the fuel gas discharge part 120c decreases. The reason that the temperature T3 of the fuel gas discharge part 120c drops is that if the recirculation flow rate of the exhaust fuel gas decreases excessively, the gas flow rate in which the fuel gas and the exhaust fuel gas recirculation gas are combined decreases, and the gas flow rate at which the amount of heat in the high-temperature region in the vicinity of the central part 120b of the power generation region 120 is transferred to the fuel gas discharge part 120c decreases. On the other hand, in a range where the flow rate of the exhaust fuel gas recirculation is equal to or more than a certain value, if the flow rate of the exhaust fuel gas is lowered within the range, the amount of heat absorption by the reforming reaction decreases and the temperature T2 of the fuel gas supply part 120a rises, and the temperature T3 of the fuel gas discharge part 120c rises slightly.

Figure 8:
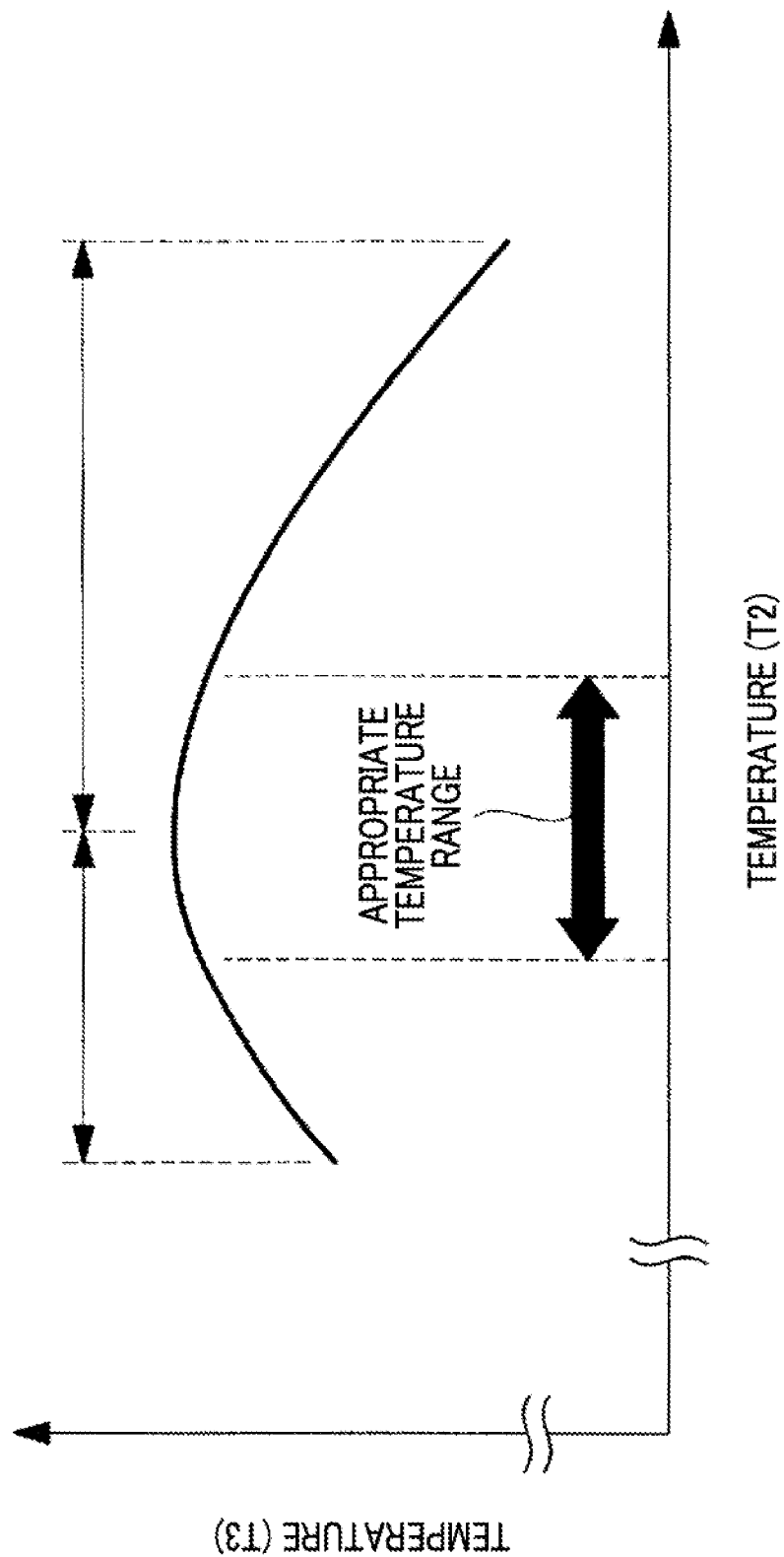
FIG. 8 is a view illustrating the relationship between the temperature T2 and the temperature T3 in the cell stack in the exhaust fuel gas flow rate control and the fuel utilization ratio control according to the power generation system according to the embodiment of the present invention.

That is, in a case where the flow rate of the exhaust fuel gas is controlled, the temperature T2 in the vicinity of a fuel gas supply port in the cell stack 101 and the temperature T3 of the fuel gas discharge part 120c has a relationship in which the temperature 13 of the fuel gas discharge part 120c has a maximum value with respect to the temperature T2 of the fuel gas supply part 120a as illustrated in FIG. 8. For this reason, in controlling the temperature T2 of the fuel gas supply part 120a in the cell stack 101, an appropriate temperature range is present from the relationship with the temperature T3 of the fuel gas discharge part 120c, and the temperature T2 of the fuel gas supply part 120a is controlled to within the appropriate temperature range, so that the temperature T3 of the fuel gas discharge part 120c can be brought into a more optimal state. That is, by controlling the temperature of the fuel gas supply part 120a of the power generation region 120 to within the appropriate temperature range, the temperature distribution state (arc-shaped temperature distribution state) of the Dower generation region 120 in the fuel gas flow direction of the cell stack 101 can be optimized. That is, the temperature T2 of the fuel gas supply part 120a and the temperature of the fuel gas discharge part 120c in the cell stack 101 can be made substantially uniform. That is, the temperature of the region (the fuel gas supply part 120a and the fuel gas discharge part 120c) of the power generation region 120 having a relatively low temperature atmosphere in the longitudinal direction of the cell stack can be raised, and the power generation output of the cell stack 101 can be improved.

The appropriate temperature range of the temperature T2 of the fuel gas supply part 120a of the power generation region 120 in the cell stack 101 is determined on the basis of the temperature T1 of the central part 120b. A lower limit temperature of the appropriate temperature range is temperature TL1, and an upper limit temperature is temperature TL2. In the fuel gas flow direction (longitudinal direction) in the cell stack 101, the vicinity of the center of the power generation region 120 has a highest-temperature state. For this reason, by measuring the temperature T1 of the central part 120b of the power generation region 120 by the temperature measurement unit, the substantially highest temperature in the cell stack 101 can be measured. In this case, for example, by setting a temperature of 80% of the temperature of the central part 120b as the lower limit temperature TL1 and setting a temperature of 90% as the upper limit temperature TL2, the appropriate temperature range of the fuel gas supply part 120a of the power generation region 120 can be determined. In the present embodiment, for example, in a case where the temperature T1 of the central part 120b is about 930° C., the appropriate temperature range is set as about 750° C. to 850° C. As for the appropriate temperature range, the relationship between the temperature T2 of the fuel gas supply part 120a and the temperature T3 of the fuel gas discharge part 120c in the cell stack 101 as illustrated in FIG. 8 may be obtained in advance by experiments or the like, and the appropriate temperature range may be set on the basis of experimental data.

Since the exhaust fuel gas contains steam generated by the power generation reaction, the exhaust fuel gas recirculation gas plays a role of supplying the steam to the SOFC. For this reason, if the recirculation flow rate of the exhaust fuel gas decreases, the amount of steam supplied to the SOFC also decreases. During the rated operation of the SOFC, for example, the S/C is set to 3.0 to 5.0. Therefore, the lower limit of the recirculation flow rate of the exhaust fuel gas is determined on the basis of the S/C during the rated operation of the SOFC. Since the recirculation gas flow rate of the exhaust fuel gas is controlled by the rotational speed of the recirculation blower 348, the upper limit of the flow rate of the exhaust fuel gas recirculation gas is determined on the basis of the rated rotational speed (maximum discharge pressure or the like) of the recirculation blower 348. That is, the exhaust fuel gas recirculation flow rate that can be controlled by the exhaust fuel gas flow rate control unit 4 has an upper limit and a lower limit, and a flow rate range where a predetermined margin (margin) taken into consideration for the upper limit and the lower limit of the exhaust fuel gas recirculation flow have is set as the exhaust fuel gas recirculation flow rate control range by the exhaust fuel gas flow rate control unit 4.

The fuel utilization ratio control unit 5 controls the fuel utilization ratio of the SOFC 313 to control the temperature T2 of the fuel gas supply part 120a to the preset predetermined appropriate temperature range (fuel utilization ratio control). Here, the fuel utilization ratio is a ratio of the fuel utilized for the power generation reaction (not the reforming reaction) to the fuel gas supplied from the outside. In the present embodiment, since the exhaust fuel gas L3 is recirculated to the fuel electrode 109 side by the fuel gas recirculation line 349 in the SOFC power generation system, the total fuel supplied to the fuel electrode 109 is evaluated including the fuel in the recirculation gas. Specifically, in order to control the fuel utilization ratio, the flow rate of the fuel gas L2 is controlled with respect to the generated current (current generated by the power generation reaction) generated and output from the cell stack 101 (the control valve 342 is controlled). In order to lower the fuel utilization ratio, the flow rate of the fuel gas is increased. Specifically, if the flow rate of the fuel gas L is increased, the flow rate of the fuel gas supplied to the SOFC 313 is increased. However, in a case where the generated current generated and output from the cell stack 101 is constant, only the reforming reaction can be increased while keeping the power generation reaction be constant. For this reason, if the flow rate of the fuel gas L2 is increased, the denominator of the fuel utilization ratio, that is, the amount of the fuel gas supplied from the outside to the SOFC 313 is increased, while the numerator of the fuel utilization ratio, that is, the fuel utilized for the power generation reaction is kept substantially constant (the reforming reaction is promoted) As result, the fuel utilization ratio decreases. That is, the fuel utilization ratio control unit 5 lowers (raises) the fuel utilization ratio by increasing (decreasing) the flow rate of the fuel gas L2.

Also, if the flow rate of the fuel gas L2 increases, the temperature of the fuel gas supply part 120a of the power generation region 120 of the cell stack 101 drops due to the heat absorption action accompanying the reforming reaction of the combustible gas in the total fuel gas. As the fuel utilization ratio of the fuel gas is smaller, the absorption of heat accompanying the reforming reaction of the contained combustible gas increases, and the temperature further drops. That is, the temperature T2 of the fuel gas supply part 120a and the fuel utilization ratio have a correlation. For this reason, by controlling the fuel utilization ratio, the reforming reaction of the total fuel gas in the power generation region 120 is controlled. That is, the temperature 2 of the fuel gas supply part 120a can be adjusted by controlling the fuel utilization ratio. For example, by increasing the fuel utilization ratio, the reforming reaction of the total fuel gas, that is, the heat absorption action can be suppressed, and the temperature of the fuel gas supply part 120a can be raised. On the other hand, by decreasing the fuel utilization ratio, the reforming reaction of the total fuel gas, that is, the heat absorption action can be promoted, and the temperature of the fuel gas supply part 120a can be lowered.

However, also in the control of the fuel utilization ratio, similarly to the exhaust fuel gas recirculation flow rate control, the temperature T2 in the vicinity of the fuel gas supply port in the cell stack 101 and the temperature T3 of the fuel gas discharge part 120c has a relationship in which the temperature T3 of the fuel gas discharge part 120c has a maximum value with respect to the temperature T2 of the fuel gas supply part 120a as illustrated in FIG. 8. In a case where the fuel utilization ratio is lowered, the reforming heat absorption increases, the reforming heat absorption is performed as being closer to the fuel gas supply part 120a, and the temperature T2 drops as being closer to the fuel gas supply part 120a of the power generation region 120. In order to lower the fuel utilization ratio, the flow rate of the fuel gas L2 is increased. However, if the flow rate of the fuel gas L2 is increased, the heat transfer amount of the amount of heat from a region such as the central part 120b of the high-temperature atmosphere in the power generation region 120 to the fuel gas discharge part 120c increases. For this reason, if the flow rate of the fuel gas L2 is increased (the fuel utilization ratio is lowered), the temperature T3 of the fuel gas discharge part 120c increases. On the other hand, if the fuel utilization ratio is increased, the temperature 2 of the fuel gas supply part 120a of the power generation region 120 rises. However, in order to increase the fuel utilization ratio, the flow rate of the fuel gas L2 is decreased. Therefore, the heat transfer amount of the amount of heat from a region such as the central part 120b of the high-temperature atmosphere to the fuel gas discharge part 120c decreases, and the temperature T3 of the fuel gas discharge part 120c of the first embodiment drops. On the other hand, in a range where the fuel utilization ratio is equal to or less a certain value (a range where the flow rate of the fuel gas L2 is equal to or more than a certain value), the fuel utilization ratio is increased within that range (decreases in the flow rate of the fuel gas L2). Then, the amount of heat absorption by the reforming reaction decreases, the temperature T2 of the fuel gas supply part 120a rises, and the temperature 13 of the fuel gas discharge part 120c slightly rises.

That is, in a case where the fuel utilization ratio is controlled, similarly to the exhaust fuel gas recirculation flow rate control, the temperature T2 of the fuel gas supply part 120a and the temperature T3 of the fuel gas discharge part 120c has a relationship in which, as illustrated in FIG. 7, the temperature T3 of the fuel gas discharge part 120c becomes lower as the temperature T2 of the fuel gas supply part 120a is made higher and a relationship in which, as illustrated in FIG. 8, the temperature T3 of the fuel gas discharge part 120c has a maximum value with respect to the temperature T2 of the fuel gas supply part 120a. That is, in FIG. 8, if the fuel utilization ratio is raised by decreasing the flow rate of the fuel gas L2, both the temperature T2 and the temperature T3 rise. However, if the fuel utilization ratio is excessively raised (the flow rate of the fuel gas L2 is excessively decreased), the temperature T2 rises but the temperature 73 drops. For this reason, by controlling the fuel utilization ratio to control the temperature of the fuel gas supply part 120a to the appropriate temperature range, the temperature distribution state (arc-shaped temperature distribution state) of the power generation region 120 in the fuel gas flow direction of the cell stack 101) can be optimized, and the output of the cell stack 101 can be improved.

If the fuel utilization ratio is excessively increased, the cell stack 101 of the SOFC 313 is long. Therefore, the fuel is deficient in a downstream region of the power generation region 120 in the fuel gas flow direction, and power cannot be generated. For this reason, the upper limit of the fuel utilization ratio s determined on the basis of the minimum fuel amount (the supply amount of the fuel gas L2) required in the SOFC 313. If the fuel utilization ratio is excessively low, there is a possibilty that the reforming reaction also increases and the S/C decreases in a partial region of the fuel electrode 109 to cause the carbon precipitation or the like. Therefore, the lower limit of the fuel utilization ratio is determined on the basis of the amount of fuel (the supply amount of the fuel gas L2) in which the carbon precipitation noes not occur. A range in which a predetermined margin (margin) is taken into consideration for the upper limit and the lower limit of the fuel utilization ratio is set as the fuel utilization ratio control range by the fuel utilization ratio control unit 5.

Figure 9:
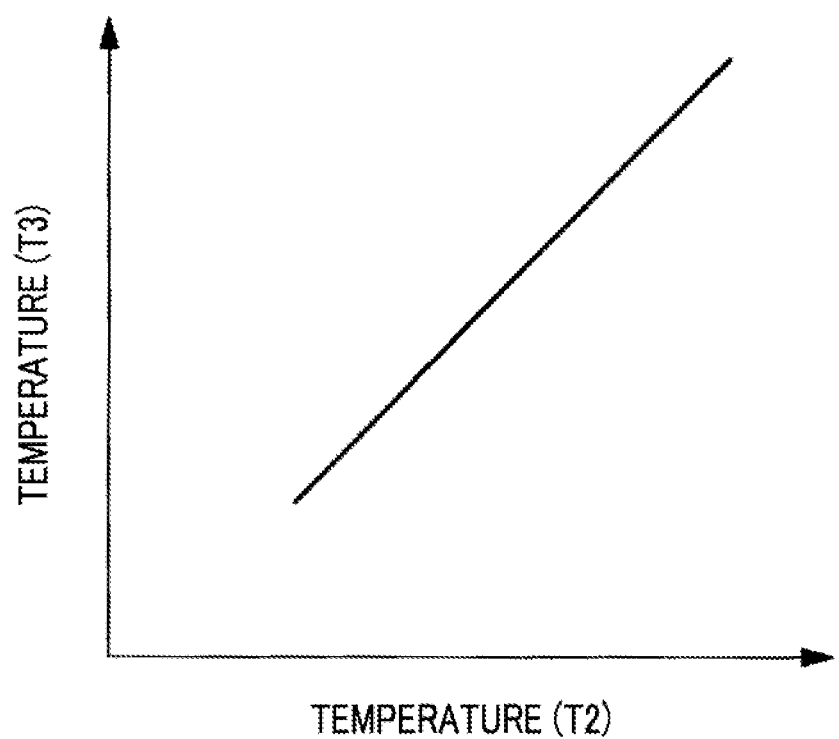
FIG. 9 is a view illustrating the relationship between the temperature T2 and the temperature T3 in the cell stack in an oxidizing gas flow rate control according to the power generation system according to the embodiment of the present invention.

The oxidizing gas temperature control unit 6 controls the temperature T2 of the fuel gas supply part 120a to the preset appropriate temperature range by controlling the temperature of the oxidizing gas (oxidizing gas temperature control). Specifically, the oxidizing gas temperature control unit 6 controls the opening degree of the control valve 335 provided in the second oxidizing gas supply line 331 and the control valve 336 provided in the bypass line 332 to control the temperature of the oxidizing gas (air A2) supplied to the SOFC 313. Although the oxidizing gas does not cause the heat absorption action due to the reforming reaction, the temperature of the oxidizing gas supplied to the SOFC 313 is lower than the temperature within the power generation chamber 215. Therefore, this affects the temperature distribution of the power generation region 120 and the entire cell stack 101. Specifically, the lower the temperature of the oxidizing gas is, the temperature within the power generation chamber 215 drops. The relationship between the temperature T2 of the fuel gas supply part 120a and the temperature T3 of the fuel gas discharge part 120c accompanying the oxidizing gas temperature control is as illustrated in FIG. 9. That is, by controlling the temperature of the oxidizing gas, the temperature of the power generation region 120 including the fuel gas supply part 120a and the temperature of the entire cell stack 101 can be controlled. For example, by raising the temperature of the oxidizing gas supplied to the power generation chamber 215, the cooling of the cell stack 101 by the oxidizing gas can be suppressed. As a result, the temperature of the power generation region 120 including the fuel gas supply part 120a and the temperature of the entire cell stack 101 can be raised. In the present embodiment, since the upstream side of the oxidizing gas supplied to the power generation chamber 215 is the fuel gas discharge part 120c side of the power generation region 120, with the oxidizing gas temperature control, the temperature control effect on the temperature T3 of the fuel gas discharge part 120c is greater than that on the temperature T2 of the fuel gas supply part 120a. For this reason, even if the temperature control of the temperature T2 of the fuel gas supply part 120a is performed, the oxidizing gas temperature control is more effective in a case where the temperature T3 of the fuel gas discharge part 120c cannot be sufficiently adjusted.

In the oxidizing gas temperature control, for example, the temperature T2 of the fuel gas supply part 120a, the temperature of the power generation region 120 including the vicinity of the fuel gas discharge part 120c and the temperature of the entire cell stack 101 can be raised. However, since the heat capacity of the power generation chamber is large, the time constant for a temperature change is large, and the responsiveness and controllability are low. On the other hand, since the exhaust fuel gas recirculation flow rate control can be operated with a relatively wide exhaust fuel gas recirculation flow rate control range, the control range of the temperature T2 of the fuel gas supply part 120a is widened. For this reason, in the present embodiment, in a case where the temperature T2 of the fuel gas supply part 120a is not within the appropriate temperature range (not in the optimal operation state), first, the exhaust fuel gas recirculation flow rate control is performed, the fuel utilization ratio control is performed in the next step, and the oxidizing gas temperature control is performed in the last step. Specifically, in a case where the exhaust fuel gas recirculation flow rate control is performed within the exhaust fuel gas recirculation flow rate control range and the temperature T2 of the fuel gas supply part 120a does not fall within the appropriate temperature range in the exhaust fuel gas recirculation flow rate control range, the fuel utilization ratio control is performed within the fuel utilization ratio control range as the next step. In the fuel utilization rate control range, in a case where the temperature T2 of the fuel gas supply part 120a does not fall within the appropriate temperature range, it is more preferable to proceed in the order of the steps of performing the oxidizing gas temperature control as necessary as the last step.

The order of the exhaust fuel gas recirculation flow rate control, the fuel utilization ratio control, and the oxidizing gas temperature control by the temperature distribution control unit 3 may be appropriately changed, and at least one of the exhaust fuel gas flow rate control unit 4, the fuel utilization ratio control unit 5, and the oxidizing gas temperature control unit 6 may be provided. As long as the temperature T2 of the fuel gas supply part 120*a* of the power generation region 120 in the cell stack 101 can be controlled, the present invention is applicable without being limited to the exhaust fuel gas recirculation flow rate control, the fuel utilization ratio control, and the oxidizing gas temperature control.

Figure 10:
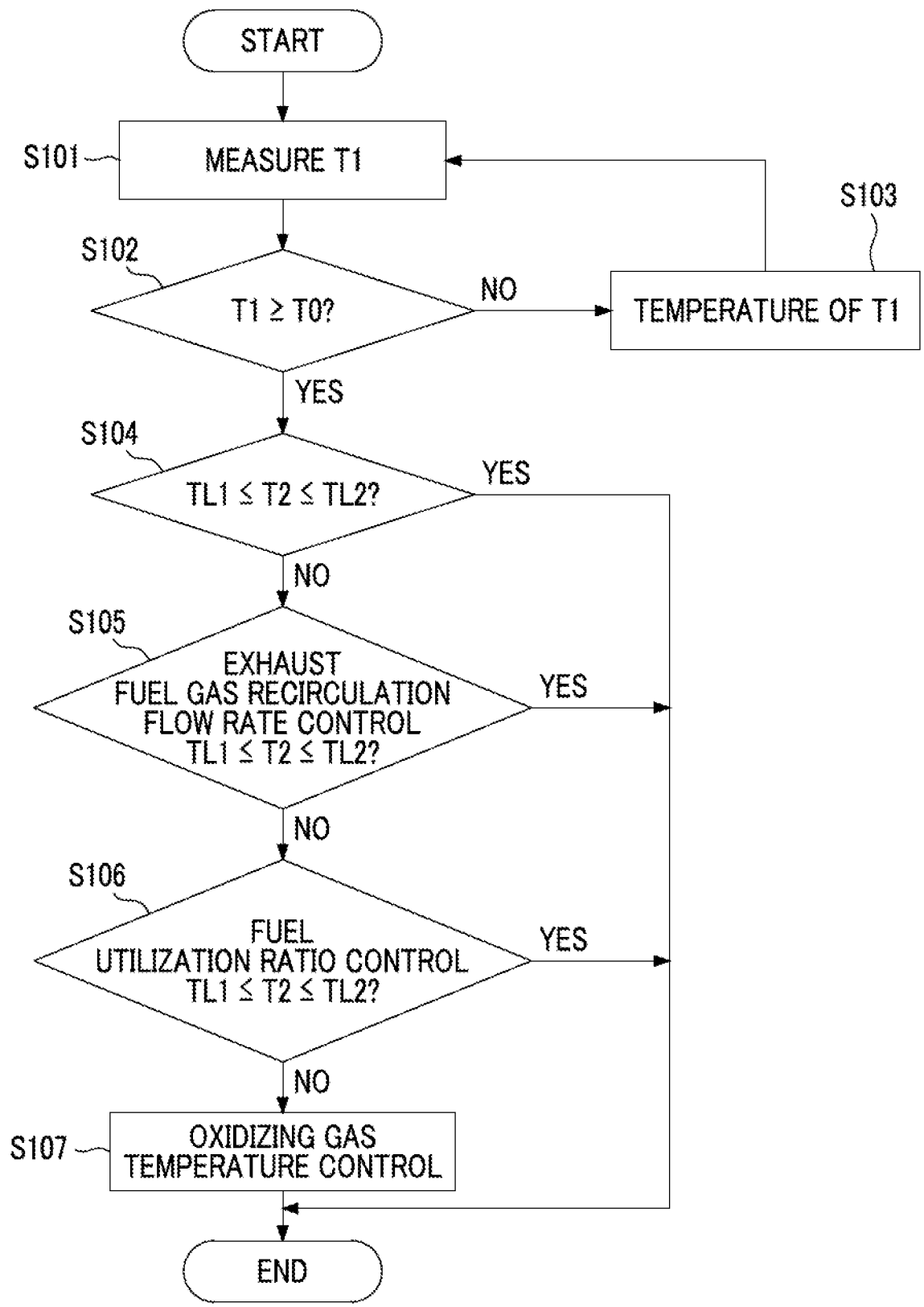
FIG. 10 is a view illustrating a flowchart of a temperature distribution control by a temperature distribution control unit according to the embodiment of the present invention.

Next, a temperature distribution control by the above-described temperature distribution control unit 3 will be described with reference to FIG. 10. The flow illustrated in FIG. 10 is repeatedly executed at a predetermined control cycle while the SOFC is started.

First, the temperature T1 of the central part 120*b* of the power generation region 120 of the cell stack 101 is measured (S101). Then, it is determined whether or not the temperature T1 of the central part 120*b* is equal to or higher than a predetermined temperature T0 (S102). This temperature distribution control is to determine whether or not the power generation region 120 can be controlled to an appropriate temperature distribution state by the temperature distribution control unit 3, and a predetermined temperature T0 is set to be, for example, within a range from 900° C. to 950° C. in the present embodiment. If the temperature T1 of the central part 120*b* has reached the predetermined temperature T0, the temperature distribution of the entire power generation region 120 can be adjusted to the optimal temperature state by adjusting the temperature T0 of the fuel gas supply part 120*a* to within the appropriate temperature range. If the temperature T1 of the central part 12*b* exceeds the predetermined temperature T0 and is brought into an excessively high-temperature state, there is a possibility that the damage or the like of the SOFC 313 may be caused. Therefore, it is preferable to satisfy the temperature T1 of the central part 120*b*≈the predetermined temperature T0.

In a case here the temperature T1 of the central part 120*b* of the power generation region 120 of the cell stack 101 is lower than the predetermined temperature T0 (NO determination in S102), the temperature T1 is adjusted (S103). Specifically, in a case where the temperature T1 of the central part 120*b* is lower than the predetermined temperature T0, the current is increased to generate heat by controlling the current flowing through the power generation region 120 (for example, a current increase command) in order to raise the temperature T1 of the central part 120*b*. In a case where the temperature T1 of the central part 120*b* is lower than the predetermined temperature T0, the temperature of the oxidizing gas supplied to the SOFC 313 may be raised by carrying out the oxidizing gas temperature control (S107) in a later step first.

In a case where the temperature T1 of the central part 120*b* of the power generation region 120 of the cell stack 101 is equal to or higher than the predetermined temperature T0 (YES determination in S102), it is determiner whether or not the temperature T2 of the fuel gas supply part 120*a* is within the appropriate temperature range (TL1≤T2≤TL2) (S104). In a case where the temperature T2 of the fuel gas supply part 120*a* is within the appropriate temperature range (YES determination in S104), it is estimated that the temperature distribution state of the entire Dower generation region 120 is optimal. Therefore, the temperature distribution control is terminated, and the flow illustrated in FIG. 10 is repeatedly executed in a predetermined control cycle.

Figure 11:
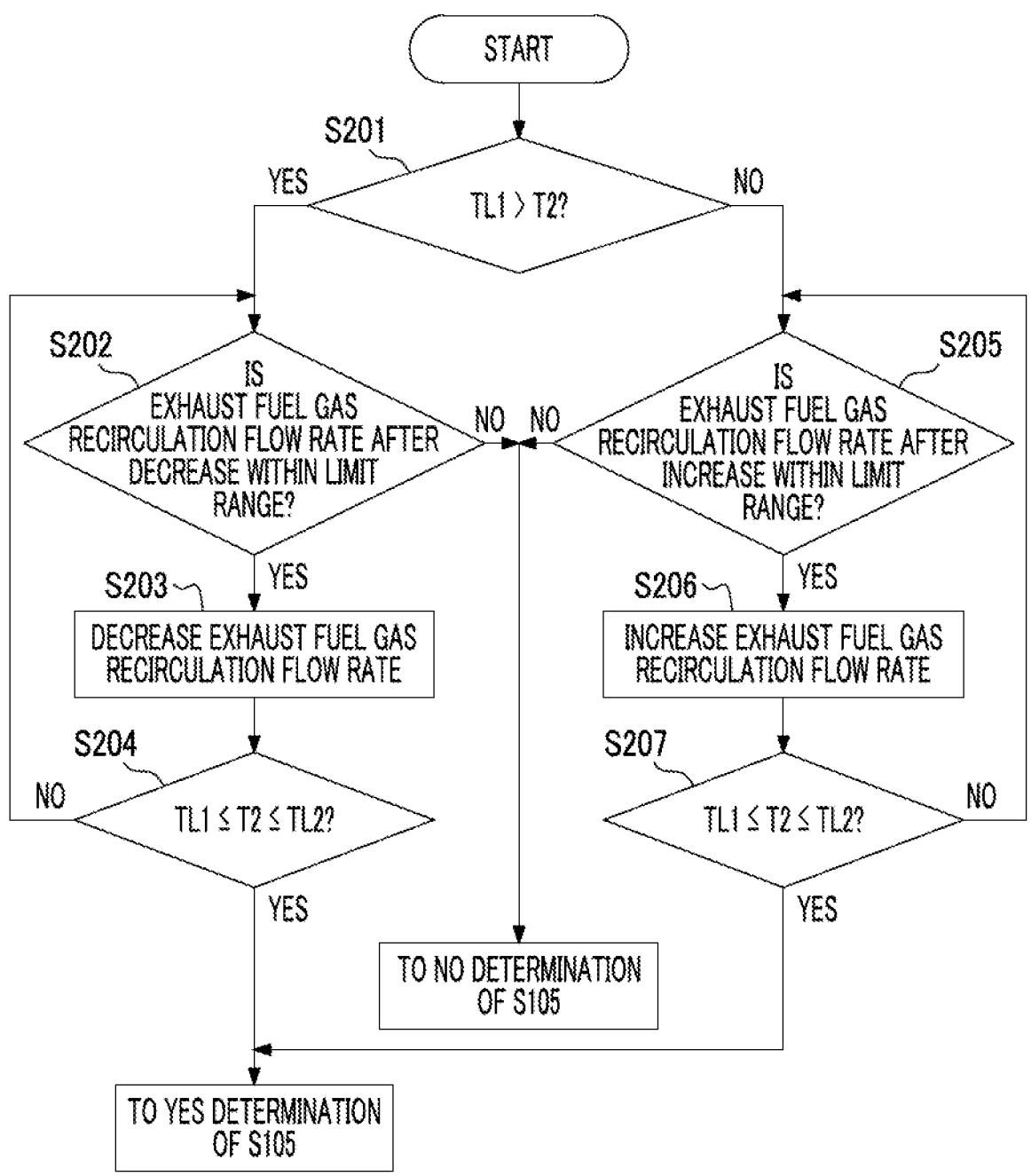
FIG. 11 is a view illustrating a flowchart of the exhaust fuel gas flow rate control by the temperature distribution control unit according to the embodiment of the present invention.

In a case where the temperature T2 of the fuel gas supply part 120*a* of the power generation region 120 in the cell stack 101 is not within the appropriate temperature range (NO determination in S104), the recirculation flow rate of the exhaust fuel gas is controlled in the exhaust fuel gas recirculation flow rate control range, and it is determined whether the temperature T2 of the fuel gas supply part 120*a* falls within the appropriate temperature range (S105) The exhaust fuel gas recirculation flow rate control in S105 will be separately described with reference to FIG. 11.

In a case where the control of recirculating a part of the exhaust fuel gas L3 as the exhaust fuel gas recirculation flow rate is performed the exhaust fuel gas recirculation flow rate control range and the temperature T2 of the fuel gas supply part 120*a* of the power generation region 120 in the cell stack 101 falls within the appropriate temperature range (YES determination in S105), it is estimated that the temperature distribution state of the entire power generation region 120 has been optimized. Therefore, the temperature distribution control is terminated. In a case where the recirculation flow rate of the exhaust fuel gas is controlled in the exhaust fuel gas recirculation flow rate control range and the temperature T2 of the fuel gas supply part 120*a* does not fall within the appropriate temperature range (NO determination in S105) this means that the temperature T2 of the fuel gas supply part 120*a* cannot be set to the appropriate temperature range only by controlling the gas recirculation flow rate.

For this reason, next, the fuel utilization ratio is controlled in the fuel utilization ratio control range, and it is determined whether or not the temperature T2 of the fuel gas supply part 120*a* of the power generation region 120 in the cell stack 101 falls within the appropriate temperature range (S106). The fuel utilization ratio control in S106 will be separately described with reference to FIG. 12.

In a case where the fuel utilization ratio is controlled in the fuel utilization ratio control range and the temperature T2 of the fuel gas supply part 120*a* of the power generation region 120 in the cell stack 101 falls within the appropriate temperature range (YES determination in S106), it is estimated that the temperature distribution state of the entire power generation region 120 has been optimized. Therefore, the temperature distribution control is terminated. In a case where the fuel utilization ratio is controlled within the fuel utilization ratio control range and the temperature T2 of the fuel gas supply part 120*a* does not fall within the appropriate temperature range (NO determination in S106), the temperature 12 of the fuel gas supply part 120*a* cannot be set to be in the appropriate temperature range only by controlling the fuel utilization ratio.

For this reason, next, the temperature of the oxidizing gas is controlled (S107), and the temperature T2 of the fuel gas supply part 120*a* in the cell stack 101 is adjusted to be within the appropriate temperature range. Since the temperature control of the oxidizing gas has a slow response, it is more preferable to prioritize the control based on the aforementioned exhaust fuel gas recirculation flow rate and fuel utilization ratio, and to control the temperature of the oxidizing gas as necessary. In a case where NO is determined in S106 without performing S107, the temperature distribution control may be terminated. In a case where the temperature T2 of the fuel gas supply part 120*a* does not fall within the appropriate temperature range in a stage in which S106 or S107 is executed, for example, an operator may be notified of the fact that the temperature distribution state of the entire power generation region 120 is not optimal.

Next, the exhaust fuel gas recirculation flow rate control (S105) by the above-described temperature distribution control unit 3 will be described with reference to FIG. 11. The flow illustrated in FIG. 11 is the details of the exhaust fuel gas recirculation flow rate control (S105) of the temperature distribution control in FIG. 10, and is started when the exhaust fuel gas recirculation flow rate control (S105) is executed.

First, it is determined whether or not the temperature T2 of the fuel gas supply part 120a of the power generation region 120 in the cell stack 101 is lower than the lower limit temperature TL1 of the appropriate temperature range (S201). In a case where the temperature T2 of the fuel gas supply part 120a is lower than the lower limit temperature TL1 of the appropriate temperature range (YES determination in S201) and in a case where the recirculation flow rate of the exhaust fuel gas is decreased by a predetermined amount, it is determined whether or not the exhaust fuel gas recirculation flow rate after the decrease is within an exhaust fuel gas recirculation flow rate limit range (S202). Then, in a case where the recirculation flow rate of the exhaust fuel gas is deceased by a predetermined amount and in a case where the recirculation flow rate of the exhaust fuel gas after the decrease is within the exhaust fuel gas recirculation flow rate limit range (YES determination in S202), the recirculation flow rate of the exhaust fuel gas is actually decreased by the predetermined amount (S203). The predetermined amount in a case where the recirculation flow rate of the exhaust fuel gas is decreased may be determined on the basis of the magnitude of a difference between the temperature T2 of the fuel gas supply part 120a to be changed by a single decrease in the exhaust fuel gas recirculation flow rate and the appropriate temperature range of the temperature T2. That is, if the predetermined amount is set to be large, the temperature T2 of the fuel gas supply part 120a can be largely changed.

Next, after the recirculation flow rate of the exhaust fuel gas is decreased by the predetermined amount, it is determined whether or not the temperature T2 of the fuel gas supply part 120a of the power generation region 120 in the cell stack 101 is within the appropriate temperature range (S204). In a case where the temperature T2 of the fuel gas supply part 10a is not within the appropriate temperature range (NO determination in S204), the processing returns to S202, and the control of decreasing the recirculation flow rate of the exhaust fuel gas is executed again.

In a case where the temperature T2 in the vicinity of the fuel gas supply port of the power generation region 120 in the cell stack 101 falls within the appropriate temperature range (YES determination in S204), this indicates that the temperature distribution state of the entire power generation region 120 has been optimized by the control of the exhaust fuel gas recirculation flow rate, and the processing proceeds to YES determination in S105 and the temperature distribution control is terminated.

In a case where the recirculation flow rate of the exhaust fuel gas is decreased by the predetermined amount and the recirculation flow rate of the exhaust fuel gas after the decreases is not within the exhaust fuel gas recirculation flow rate limit range (NO determination in S202), this indicate that the control of the recirculation flow rate of the exhaust fuel gas cannot be performed any more. Therefore, the processing proceeds to NO determination of the recirculation flow rate control of the exhaust fuel gas (S105), and the fuel utilization ratio control (S106) is executed.

On the other hand, in a case where the temperature T2 of the fuel gas supply part 120a of the power generation region 120 in the cell stack 101 is not lower than the lower limit temperature TL1 of the appropriate temperature range (No determination in S201), it is determined that the temperature T2 of the fuel gas supply part 120a is not within the appropriate temperature range by S104 (NO determination in S104). Therefore, the temperature T2 of the fuel gas supply part 120a is equal to or higher than the upper limit temperature TL2 of the appropriate temperature range. For this reason, the processing of lowering the temperature T2 of the fuel gas supply part 120a is performed. First, in a case where the recirculation flow rate of the exhaust fuel gas is increased by the predetermined amount, it is determined whether or not the recirculation flow rate of the exhaust fuel gas after the increase is within the exhaust fuel gas recirculation flow rate limit range (S205). Then, in a case where the recirculation flow rate of the exhaust fuel gas is increased by the predetermined amount and in a case where the recirculation flow rate of the exhaust fuel gas after the increase is within the exhaust fuel gas recirculation flow rate limit range (YES determination in S205), the recirculation flow rate of the exhaust fuel gas is actually increased by the predetermined amount (S206). The predetermined amount in a case where the recirculation flow rate of the exhaust fuel gas is increased may be determined on the basis of the magnitude of a difference between the temperature T2 of the fuel gas supply part 120a to be changed by the single decrease in the exhaust fuel gas recirculation flow rate and the appropriate temperature range of the temperature T2. That is, if the predetermined amount is set to be large, the temperature T2 of the fuel gas supply part 120a can be largely changed.

Next, after the recirculation flow rate of the exhaust fuel gas is increased by the predetermined amount, it is determined whether or not the temperature T2 of the fuel gas supply part 120a of the power generation region 120 in the cell stack 101 falls within the appropriate temperature range (S207). In a case where the temperature T2 of the fuel gas supply part 120a does not fall within the appropriate temperature range (NO determination in S207), the processing returns to S205, and the control of increasing the recirculation flow rate of the exhaust fuel gas is executed again.

In a case where the temperature T2 of the fuel gas supply part 120a of the power generation region 120 in the cell stack 101 falls within the appropriate temperature range (YES determination in S207), this indicates that the temperature distribution state of the entire power generation region 120 has been optimized by the control of the recirculation flow rate of the exhaust fuel gas, the processing proceeds to YES determination of the recirculation flow rate control of the exhaust fuel gas (S105), and the temperature distribution control is terminated.

In a case where the recirculation flow rate of the exhaust fuel gas is increased by the predetermined amount and the recirculation flow rate of the exhaust fuel gas after the increase is not within the exhaust fuel gas recirculation flow rate limit range (NO determination in S205), this indicates that the control of the recirculation flow rate of the exhaust fuel gas cannot be performed any more. Therefore, the processing proceeds to NO determination of the recirculation flow rate control of the exhaust fuel gas (S105), and the fuel utilization ratio control (S106) is executed.

Next, the fuel utilization ratio control (S106) by the above-described temperature distribution control unit 3 will be described with reference to FIG. 12. The flow illustrated in FIG. 12 is the details of the fuel utilization ratio control (S106) of the temperature distribution control in FIG. 10, and is started when the fuel utilization ratio control (S106) is executed.

First, it is determined whether or the like the temperature 12 of the fuel gas supply part 120a of the power generation region 120 in the cell stack 101 is lower than the lower limit temperature TL1 of the appropriate temperature range (S301). In a case where the temperature T2 of the fuel gas supply part 120a is lower than the lower limit temperature TL1 of the appropriate temperature range (YES determination in S301), the processing of raising the temperature T2 of the fuel gas supply part 120a is performed. For this reason, in a case where the temperature T2 is raised by increasing the fuel utilization ratio by the predetermined amount, it is determined whether or not the fuel utilization ratio after the increase is within a fuel utilization ratio limit range (S302). Then, in a case where the fuel utilization ratio is increased by the predetermined amount and in a case where the fuel utilization ratio after the increase is within the fuel utilization ratio limit range (YES determination in S302), the fuel utilization ratio is actually increased b the predetermined amount (S303). The predetermined amount in a case where the fuel utilization ratio is increased may be determined on the basis of the magnitude of the difference between the temperature 2 of the supply part 120a to be changed by the single increase in the fuel utilization ratio and the appropriate temperature range of the temperature T2.

Next, after the fuel utilization ratio is increased by the predetermined amount, it is determined whether or not the temperature T2 of the fuel gas supply part 120a of the power generation region 120 in the cell stack 101 falls within the appropriate temperature range (S304). In case where the temperature T2 of the fuel gas supply part 120a does not falls within the appropriate temperature range (NO determination in S304), the processing returns to S302, and the control of increasing the fuel utilization ratio is executed again.

In a case where the temperature T2 of the fuel gas supply part 120a of the power generation region 120 in the cell stack 101 falls within the appropriate temperature range (YES determination in S304), this indicates that the temperature distribution state of the entire power generation region 120 has been optimized by the control the fuel utilization ratio, the processing proceeds to YES determination in the fuel utilization ratio control (S106), and the temperature distribution control is terminated.

In a case where the fuel utilization ratio is increased by the predetermined amount and in a case where the fuel utilization ratio after the increase is not within the fuel utilization ratio limit range (NO determination in S302), this indicates that the control of the fuel utilization ratio cannot be performed any more. Therefore, the processing proceeds to the NO determination of the fuel utilization ratio control (S106), and the oxidizing gas temperature control (S107) is executed.

On the other hand, in a case where the temperature T2 of the fuel gas supply part 120a of the power generation region 120 in the cell stack 101 is not lower than the lower limit temperature TL1 of the appropriate temperature range (NO determination in S301), it is determined that the temperature T2 of the fuel gas supply part 120a is not within the appropriate temperature range by S104 (NO determination in S104). Therefore, the temperature T of the fuel gas supply part 120a is equal to or higher than the upper limit temperature TL2 of the appropriate temperature range. For this reason, the processing of lowering the temperature T2 of the fuel gas supply part 120a is performed. First, in a case where the fuel utilization ratio is decreased by the predetermined amount, it is determined whether or not the fuel utilization ratio after the increase is within the fuel utilization ratio limit range (S305) Then, in a case where the fuel utilization ratio is decreased by the predetermined amount and in a case where the fuel utilization ratio after the decrease is within the fuel utilization ratio limit range (YES determination in S305), the fuel utilization ratio is actually decreased by the predetermined amount (S306). The predetermined amount in a case where the fuel utilization ratio is decreased may be determined on the basis of the magnitude of the difference between the temperature T2 of the fuel gas supply part 120a to be changed by the single decrease in the fuel utilization ratio and the appropriate temperature range of the temperature T2.

Next, after the fuel utilization ratio is decreased by the predetermined amount, it is determined whether or not the temperature T2 of the fuel gas supply part 120a of the power generation region 120 in the cell stack 101 falls within the appropriate temperature range (S307). In case where the temperature T2 of the fuel gas supply part 120a does not fall within the appropriate temperature range (NO determination in S307), the processing returns to S305, and the control of decreasing the fuel utilization ratio is executed again.

In a case where the temperature T2 of the fuel gas supply part 120a of the power generation region 120 in the cell stack 101 falls within the appropriate temperature range (YES determination in S307), this indicates that the temperature distribution state of the entire power generation region 120 has been optimized by the control the fuel utilization ratio, the processing proceeds to YES determination in the fuel utilization ratio control (S106), and the temperature distribution control is terminated.

In a case where the fuel utilization ratio is increased by the predetermined amount and in a case where the fuel utilization ratio after the increase is not within the fuel utilization ratio limit range (NO determination in S305) this indicates that the control of the fuel utilization ratio cannot be performed any more. Therefore, the processing proceeds to the NO determination of the fuel utilization ratio control (S106), and the oxidizing gas temperature control (S107) is executed.

Next, a method of starting the power generation system 310 of the present embodiment will be described. The start of the power generation system 310 is controlled by the start/stop control unit 2 included in the control device 380. In a case where the power generation system 310 is started, the SOFC 313 starts after the MG 311 has started. In a case where the power generation system 310 is started, the control device 380 starts the MGT 311 can pressurize the air electrode 113 of the SOFC 313 by first stabilizing the output of the MGT 311 at a certain load and then removing a part of the air A (air A2) supplied from the compressor 321 to supply the air to the SOFC 313.

First, when the MGT 311 is started, the compressor 321 compresses the air A, the combust r 322 mixes and combusts the air A1 and the fuel gas L1, and the turbine 323 is rotated by the combustion gas G, so that the generator 312 starts the power generation. In order to supply the total amount of the air A to the combustor 322, the control valves 335, 336, and 337 are preferably fully closed.

In the starting of the SOFC 313, first, at least a part of the air A (air A2) is supplied to the air electrode 113 of the SOFC 313 to start a pressure rise and start a temperature rise. The control valve 337 of the exhaust oxidizing gas discharge line 333 and the shut-off valve 338 of the exhaust oxidizing gas supply line 334 are closed, and the control valve 327 is opened by a predetermined opening degree. Here, the opening degree for controlling the pressure rising speed is adjusted. The control valve 327 is maintained at a predetermined opening degree, and the control valve 336 is closed. Then, the air A2 that is at least a part of the air A compressed by the compressor 321 is supplied from the second oxidizing gas supply line 331 to the SOFC 313 side. The temperature of the air A2 is raised in temperature to 300 to 500° C. by the heat exchanger 330, and thereby, the pressure of the SOFC 313 rises together with the temperature rise as the air A2 is supplied.

On the other hand, in the fuel electrode 109 of the SOFC 313, the pressure rise is started by supplying an inert gas such as nitrogen to the fuel electrode side. With the control valve 346 and the control valve 347 closed and the recirculation blower 348 stopped, the inert gas is supplied and the recirculation blower 348 in the fuel gas recirculation line 349 is driven. The recirculation blower 348 may be started before the fuel electrode 109 is pressurized. Then, the inert gas is supplied from the second fuel gas supply line 341 to the SOFC 313 side and is recirculated by the fuel gas recirculation line 349. Accordingly, the pressure of the SOFC 313 rises as the inert gas is supplied.

Then, if the pressure on the air electrode 113 side of the SOFC 313 becomes equal to the outlet pressure of the compressor 321, the control valve 327 controls the flow rate of air supplied to the SOFC 313, and opens the shut-off valve 338 to open the exhaust air A3 from the SOFC 313 to supply the exhaust air A3 from the exhaust oxidizing gas supply line 334 to the combustor 322. The SOFT 313 and the MGT 311 are coupled to each other, and a transition is made to a combined state in which air is supplied to the combustor 322 of the MGT 311 via the SOFC 313. In this case, the control valve 337 may also control the opening degree to emit apart of the exhaust air A3 from the SOFC 313 to the outside of the system. At the same time, the opening degree of the control valve 346 may be controlled to emit the inert gas from the SOFC 313 to the outside of the system. Then, if the pressure on the air electrode 113 side and the pressure on the fuel electrode 109 side in the SOFC 313 reach target pressures, the pressure rise of the SOFC 313 is completed.

By adjusting the opening degree of the control valve 327 and the control valve 336 after the transition to the combined state, the flow rate of the air A2 supplied to the SOFC 313 in order to raise the temperature of the SOFC 313 is increased, and the flow rate of the air A1 supplied to the combustor 322 via the first oxidizing gas supply line 326 is decreased. Then, until the SOFC 313 starts the power generation after a predetermined condition is satisfied, the total amount of the air A may be controlled to pass through the SOFC 313, pass through the exhaust oxidizing gas supply line 334 from the exhaust oxidizing gas discharge line 333, and be supplied to the combustor 322 so that the temperature of the SOFC 313 can be quickly raised at as uniform a temperature as possible.

Thereafter, after the pressure control of the SOFC 313 is stabilized, the opening of the control valve 337 is closed, while the opening of the shut-off valve 338 is maintained. For this reason, the exhaust air A3 from the SOFC 313 continues being supplied from the exhaust oxidizing gas supply line 334 to the combustor 322.

The control device 380 executes a first temperature raising mode, a second temperature raising mode, and a load raising mode in order to start the SOFC 313, raises the power generation chamber temperature, which is the temperature around the cell stack (not illustrated), to a rated temperature, increase the load to a target load.

First, in the first temperature raising mode, by supplying the air A2, which is heated by the heat exchange by the heat exchanger 330, to the air electrode 113 as described above, the power generation chamber including the air electrode 113 is raised in temperature. If a first temperature threshold is reached by the first temperature raising mode, the mode is switched from the first temperature raising mode to the second temperature raising mode. Here, the first temperature threshold is a temperature at which the air electrode 113 functions as a catalyst for the combustion reaction with the fuel gas L2 serving as the combustible gas, and is set, for example, in a range of about 400° C. to 450° C.

In the second temperature raising mode, similarly to the first temperature raising mode, the air A2 is supplied to the air electrode 113, and the fuel gas L2 is added to the air A2 by opening the control valve 372 provided in the air electrode fuel supply line 371. At the air electrode 113 into which the air A2 and the fuel gas L2 flow, the fuel gas L2 is catalytically combusted at the air electrode 113 due to the catalytic action of the air electrode 113 to generate combustion heat. In this way, in the second temperature raising mode, the air electrode 113 is raised in temperature using the heat generated by the catalytic combustion.

If the power generation chamber temperature reaches a second temperature threshold, the control device 330 switches from the second temperature raising mode to the load raising mode.

In the load raising mode, in order to shorten the temperature raising time, similarly to the first temperature raising mode, the air A2 is supplied to the air electrode 113, the fuel gas L2 is supplied to the fuel electrode 109 by opening the control valve 342 of the second fuel gas supply line 341, and the pure water is supplied to the fuel electrode 109 by driving the pump 362 of the pure water supply line 361 to start the power generation. In the load raising mode, the temperature of the power generation chamber is raised by the heat generated by the catalytic combustion caused by adding and supplying the fuel gas L2 to the air electrode 11 and the heat generated by both power generation. In the load raising mode, after the temperature of the power generation chamber of the SOFC 313 rises until the temperature can be maintained due to the self-heating by the power generation, the supply amount of the fuel gas L2 added and supplied to the air electrode 113 is gradually decreased, and for example, a control is performed such that the addition and supply of the fuel gas L2 to the air electrode 113 are zero at the same time when the target load is reached.

The above second temperature threshold is set, for example, 750° C. or higher. This is because, if the fuel gas L2 is put into the fuel electrode 109 when the fuel electrode 109 has not reached a sufficient temperature, the SOFC 313 generates power while the solid electrolyte 111 remains in a high resistance state, an electrode constituent material deteriorates due to a structural change, and the performance of the SOFC 313 degrades. The second temperature threshold is preferably set to around 750° C. such that the performance of the SOFC 313 hardly degrades.

If the component of the exhaust fuel gas L3 is a component that can be put into the combustor 322, the control valve 346 is closed while the control valve 347 is opened. Then, the exhaust fuel gas L3 from the SOFC 313 is supplied from the exhaust fuel gas supply line 345 to the combustor 322. In this case, the amount of the fuel gas L1 supplied to the combustor 322 is reduced by the control valve 352 provided in the first fuel gas supply line 351.

In the load raising mode, if the power generation chamber temperature reaches a power generation chamber target temperature and the load reaches a target load such as a rated load, the startup is completed.

The power generation chamber target temperature is equal to or higher than a temperature at which the SOFC 313 can maintain the temperature due to the self-heating caused by the heat generated by the power generation and is set, for example, at 800 to 950° C.

In this way, the power generation in the generator 312 by the driving of the MGT 311 and the power generation by the pressure rise, the temperature rise, and the starting of the SOFC 313 are performed, and the power generation system 310 is brought into a steady operation.

Here, a method of stopping the SOFC 313 according to the present embodiment will be described. The stop of the SOFC 313 is also controlled by the start/stop control unit 2 included in the control device 380. In a case where the SOFC 313 is stopped, during normal stop or emergency stop of the SOFC 313, first, continuation of the supply of the fuel gas L2 to the fuel electrode 109 and the supply of the air A2 that is the oxidizing gas to the air electrode 113 are stopped.

In order to stop the SOFC 313, the control valves 335, 336, and 347 and the shut-off valve 338 are closed to stop the combustor 322, while the control valve 342 has a predetermined opening degree and the control valves 337 and 346 are opened (the control valves 337 and 346 are, for example, half-open) to emit the exhaust air A3 and the exhaust fuel gas L3 to the outside of the system. Then, the SOFC 313 stops the power generation in a state where the supply of the air A2 to the air electrode 113 is stopped, while the supply of the fuel gas L2 to the fuel electrode 109 and the supply of the pure water via the pure water supply line 361 are continued, and the reducing atmosphere of the fuel electrode is maintained. Since the fuel gas L2 and the pure water are supplied to the fuel electrode 109, and a part of the exhaust fuel gas L3 discharged from the fuel electrode 109 to the exhaust fuel gas line 343 is circulated to the fuel electrode 109 through the fuel gas recirculation line 349, an excessive pressure drop of the system on the fuel electrode side can be prevented.

If the temperature of the SOFC 313 cools down and drops below a predetermined temperature, in order to prevent the reduction of the air electrode 113 accompanying the stop of the power generation and the deterioration due to the oxidation of the fuel electrode 109, the SOFC 313 is protected by purging the inert gas such as nitrogen to the system on the fuel electrode 109 side after the operation of the SOFC 313 is stopped. If the SOFC 313 is cooled to a preset predetermined temperature, the control valve 342 is closed to stop the supply of the fuel gas L2, while the control valve 346 is kept open and a part of the exhaust fuel gas L3 is discharged to the outside of the system. In the SOFC 313, a purge gas (inert gas) is supplied to the fuel electrode 109 from a purge gas supply line (not illustrated), while the exhaust fuel gas L3 of the exhaust fuel gas line 343 and the fuel gas recirculation line 349 is discharged from the control valve 346 to the outside of the system. For that reason, the reducing atmosphere of the fuel electrode 109 is replaced with an inert atmosphere in a short time by the purge gas. By replacing the atmosphere of the system on the fuel electrode 109 side with the inert gas, the material of the air electrode 113 can be prevented from being reduced due to the diffusion of the remaining fuel gas to the air electrode 113. Since the fuel gas is circulated to the fuel electrode 109 through the fuel gas recirculation line 349 while supplying the inert gas such as nitrogen to the system on the fuel electrode 109 side, the SOFC 313 can be cooled while preventing an excessive pressure drop of the system on the fuel electrode side caused by the discharge of the exhaust fuel gas L3 to the outside of the system.

The inert gas supplied to the system on the fuel electrode 109 side is a nitrogen ($N_2$) gas, an argon (Ar) gas, a He (helium) gas, a combusted exhaust gas, or the like. The inert gas may be a mixed gas of $N_2$ gas and $H_2$ gas. The $H_2$ gas contained in the inert gas reacts with oxygen ($O_2$) diffused from the air electrode 113 side. Hence, by containing the $H_2$ gas in the inert gas, the diffused oxygen can be prevented from reacting with the material of the fuel electrode 109.

In parallel with the supply of the inert gas to the system on the fuel electrode 109 side, a cooling gas is supplied from a cooling gas supply line (not illustrated) to the system on the air electrode 113 side. The cooling gas preferably contains oxygen. The temperature of the cooling gas is lower than the air A2 supplied to the SOFC 313 during the power generation. The cooling gas is suitably outside air (room temperature air) or the like. The room temperature refers to a temperature of about 0° C. to 40° C. The cooling gas supply line (not illustrated) may be connected to, for example, the second oxidizing gas supply line 331 so that the cooling gas can be supplied to the air electrode 113 of the SOFC 313, and the cooling gas may be supplied separately supplied by a separate compressor or blower provided in the cooling gas supply line (not illustrated).

As described above, according to the fuel cell temperature distribution control system, the fuel cell, and the temperature distribution control method according to the present embodiment, the temperature of the fuel gas supply part 120a in the longitudinal direction of the power generation region 120 in the longitudinal direction of the cell stack 101 is set as a control target. The temperature distribution state of the power generation region 120 in the fuel gas flow direction in the cell stack 101 is the arc-shaped temperature distribution state that is the state where the temperature of the fuel gas supply part 120a and the temperature of the fuel gas discharge part 120c have dropped with respect to the temperature of the central part 120b of the power generation region 120 of the cell stack 101, and the arc-shaped temperature distribution state can be substantially uniquely estimated from the temperature of the fuel gas supply part 120a. That is, by controlling the temperature of the fuel gas supply part 120a, the temperature distribution state of the entire power generation region 120 can be controlled.

For example, in the temperature distribution state of the fuel gas flow direction in the cell stack 101, even in a case where the temperature T1 of the central part 120b of the power generation region 120 is in the appropriate temperature range, in a case where the temperature T2 of the fuel gas supply part 120a is excessively low, as an operating condition, the recirculation flow rate of the exhaust fuel gas is large or the fuel utilization ratio is low. Therefore, the amount of heat absorption of the fuel gas supply part 120a is large, and the amount of heat in the high-temperature region in the vicinity of the central part 120b is easily heat-transferred to the fuel gas discharge part 120c. In these situations, the temperature of the fuel gas discharge part 120c rises, and the amount of power generation amount of the entire cell stack 101 decreases. On the other hand, in a case where the temperature T2 of the fuel gas supply part 120a is excessively high, as an operating condition, the recirculation flow rate of the exhaust fuel gas is small or the fuel utilization ratio is high. Therefore, the amount of heat absorption of the fuel gas supply part 120a is small or the heat transfer of the amount of heat in the high-temperature region in the vicinity of the central part 120b the fuel gas discharge part 120c is small. In these situations, the temperature of the fuel gas discharge part 120c is low, and the amount of power generation of the entire cell stack 101 decreases. In this way, the temperature of the fuel gas discharge part 120c also changes according to the temperature T2 of the fuel gas supply part 120a, which may cause a decrease in the amount of power generation of the entire cell stacks 101. Therefore, by controlling the temperature T2 of the fuel gas supply part 12a to the preset predetermined appropriate temperature range, the temperature distribution state of the power generation region 120 in the cell stack 101 in the fuel gas flow direction can be appropriately controlled, and the temperature of the fuel gas discharge part 120c can also be set to an appropriate temperature. For this reason, by controlling the temperature T2 of the fuel gas supply part 120a to the preset predetermined appropriate temperature range, the operation state of the cell stack 101 can be optimized, and the power generation output can be improved.

In the related art, during the test operation adjustment of the power generation system 310, in order to suppress a decrease in the amount of power generation due to the temperature distribution state of the power generation region 120 of the cell stack 101, the operating condition adjustment is performed if the operator repeats trial and error. For this reason, substantial time is required to adjust the operating conditions, and it is difficult to efficiently optimize the operating temperature state in the entire power generation region 120. However, since the temperature distribution state of the power generation region 120 can be optimized by controlling the temperature of the fuel gas supply part 120a to within the preset predetermined appropriate temperature range, the time required for operating condition adjustment can be shortened, and the work load on the operator can be reduced.

The temperature distribution in the power generation region 120 of the cell stack 101 also depends on the type of fuel. However, since the temperature distribution state of the power generation region 120 can be optimized by controlling the temperature 12 of the fuel gas supply part 120a to within the preset predetermined appropriate temperature range, it is possible to cope with various types of fuel by appropriately setting the appropriate temperature range for each fuel type to be used. That is, it is possible to cope with the diversification of the fuel only by simple setting.

Since the appropriate temperature range of the temperature T2 of the fuel gas supply part 120a is determined on the basis of the temperature T1 of the central part 120b of the power generation region 12 in the cell stack 101, the appropriate temperature range can be easily set.

By increasing or decreasing the recirculation flow rate of the exhaust fuel gas, the temperature of the fuel gas supply part 120a is controlled to within the preset appropriate temperature range. The exhaust fuel gas includes methane ($CH_4$) that is a combustible gas that has not contributed to the power generation reaction in the power generation region 120 of the cell stack 101, and the like. For this reason, in the fuel gas supply part 120a, the temperature drop occurs due to the heat absorption action or due to the reforming reaction (for example, methane ($CH_4$), which is a combustible gas, and steam, react with each other and are reformed into hydrogen ($H_2$) and carbon monoxide (CO)) of the exhaust fuel gas. That is, the recirculation flow rate of the exhaust fuel gas and the temperature T2 of the fuel gas supply part 120a in the cell stack 101 have a correlation. For this reason, the temperature T2 of the fuel gas supply part 120a can be adjusted by controlling the recirculation flow rate of the exhaust fuel gas. For example, by reducing the recirculation flow rate of the exhaust fuel gas, the reforming reaction, that is, the heat absorption action of the exhaust fuel gas can be suppressed, and the temperature T2 of the fuel gas supply part 120a can be raised. From the above, by increasing or decreasing the recirculation flow rate of the exhaust fuel gas, it is possible to optimize the operation state of the cell stack 101 and improve the power generation output.

Since the temperature of the fuel gas supply part 120a is controlled to within the preset predetermined appropriate temperature range by increasing or decreasing the fuel utilization ratio, it is possible to optimize the operation state of the cell stack 101 and improve the power generation output. In the fuel gas supply part 120a, the temperature drop occurs due to the heat absorption action caused by the reforming reaction of the fuel gas (for example, the methane ($CH_4$), which is a combustible gas, and steam react with each other and are reformed into hydrogen ($H_2$) and carbon monoxide (CO)). That is, since the amount of reforming reaction changes with an increase or decrease in the fuel utilization ratio, which is the ratio in which the combustible gas contained in the fuel gas is used for the power generation reaction, the fuel utilization ratio and the temperature T2 of the fuel gas supply part 120a has a correlation. For this reason, the temperature T2 of the fuel gas supply part 120a can be adjusted by controlling the fuel utilization ratio of the fuel gas. For example, by increasing the fuel utilization ratio, the reforming reaction, that is, the heat absorption action of the combustible gas can be suppressed, and the temperature of the fuel gas supply part 120a can be raised.

By controlling the temperature of the oxidizing gas to control the temperature of the fuel gas supply part 120a to within the preset appropriate temperature range, it is possible to optimize the operation state of the cell stack 101 and improve the power generation output. In general, the oxidizing gas serves as a cooling source for the entire cell stack 101 and affects the temperature of the entire power generation region 120 in the SOFC 313. For this reason, by controlling the temperature of the oxidizing gas, the temperature of the entire power generation region 120 including the fuel gas supply part 120a can be controlled.

The present invention is not limited to only the above-described embodiments, and various modifications can be made without departing from the spirit of the invention.

REFERENCE SIGNS LIST

2: start/stop control unit
3: temperature distribution control unit (control unit)
4: exhaust fuel gas flow rate control unit (exhaust fuel gas recirculation flow rate control unit)
5: fuel utilization ratio control unit
6: oxidizing gas temperature control unit
101: cell stack
105: fuel battery cell
109: fuel electrode
111: solid electrolyte
113: air electrode
120: power generation region (power generation unit)
120a: fuel gas supply part
120b: fuel gas central part
120c: fuel gas discharge part
201: SOFC module
203: SOFC cartridge
207: fuel gas supply pipe
209: fuel gas discharge pipe
215: power generation chamber
217: fuel gas supply chamber
219: fuel gas discharge chamber
221: oxidizing gas supply chamber
223: oxidizing gas discharge chamber
310: power generation system 312: generator
321: compressor
322: combustor
323: turbine
325: air intake line
326: first oxidizing gas supply line
328: combustion gas supply line
329: combusted exhaust gas line
330: heat exchanger
331: second oxidizing gas supply line
332: bypass line
333: exhaust oxidizing gas discharge line
334: exhaust oxidizing gas supply line
327, 335-337, 342, 346, 347, 352, 372: control valve
338: shut-off valve
341: second fuel gas supply line
343: exhaust fuel gas line
345: exhaust fuel gas supply line
348: recirculation blower
349: fuel gas recirculation line
351: first fuel gas supply line
361: pure water supply line
362: pump
371: air electrode fuel supply line
330: control device

The invention claimed is:

1. A fuel cell temperature distribution control system comprising:
- a cell stack including a power generation unit that generates power by causing, in a fuel battery cell formed of a laminate of an air electrode, a solid electrolyte, and a fuel electrode, an oxidizing gas flowing on the air electrode side and a fuel gas flowing on the fuel electrode side to react with each other;
- a temperature measurement unit that measures a temperature of a fuel gas supply part in the power generation unit; and
- a control unit that, on the basis of a result of measurement performed by the temperature measurement unit, controls the temperature of the fuel gas supply part to within a preset appropriate temperature range based on a relationship between the temperature of the fuel gas supply part and a temperature of a fuel gas discharge part, to control a temperature distribution state including the temperature of the fuel gas supply part and the temperature of the fuel gas discharge part in a fuel gas flow direction in the power generation unit.

2. The fuel cell temperature distribution control system according to claim 1,
wherein the appropriate temperature range is determined on the basis of a temperature of a central part of the power generation unit.

3. The fuel cell temperature distribution control system according to claim 1,
wherein the fuel gas supplied to the fuel electrode includes at least a part of an exhaust fuel gas discharged from the fuel electrode side of the power generation unit as a recirculation flow rate of the exhaust fuel gas, and
wherein the control unit includes an exhaust fuel gas recirculation flow rate control unit that controls the temperature of the fuel gas supply part to within the preset appropriate temperature range by increasing or decreasing the recirculation flow rate of the exhaust fuel gas.

4. The fuel cell temperature distribution control system according to claim 1,
wherein a control unit includes a fuel utilization ratio control unit configured to control the temperature of the fuel gas supply part to within the preset appropriate temperature range by increasing or decreasing a fuel utilization ratio.

5. The fuel cell temperature distribution control system according to claim 1,
wherein the control unit includes an oxidizing gas temperature control unit that controls a temperature in the vicinity of a fuel gas supply port to within the preset appropriate temperature range by controlling the temperature of the oxidizing gas.

6. A fuel cell comprising:
- a power generation unit that generates power by causing an oxidizing gas and a fuel gas to react with each other; and
- the fuel cell temperature distribution control system according to claim 1.

7. A fuel cell temperature distribution control method, the fuel cell including a plurality of cell stacks each including a power generation unit that generates power by causing, in a fuel battery cell formed of a laminate of an air electrode, a solid electrolyte, and a fuel electrode, an oxidizing gas flowing on the air electrode side and a fuel gas flowing on the fuel electrode side to react with each other, the method comprising:
- a temperature measurement step of measuring a temperature of a fuel gas supply part in the power generation unit; and
- a control step of, on the basis of a result of measurement performed by the temperature measurement step, controlling the temperature of the fuel gas supply part to within a preset appropriate temperature range based on a relationship between the temperature of the fuel gas supply part and a temperature of a fuel gas discharge part, to control a temperature distribution state including the temperature of the fuel gas supply part and the temperature of the fuel gas discharge part in a fuel gas flow direction in the power generation unit.

* * * * *